(12) United States Patent
Wright et al.

(10) Patent No.: US 12,182,805 B2
(45) Date of Patent: Dec. 31, 2024

(54) TOKENISATION METHOD AND SYSTEM FOR IMPLEMENTING EXCHANGES ON A BLOCKCHAIN

(71) Applicant: nChain Licesning AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 17/531,695

(22) Filed: Nov. 19, 2021

(65) Prior Publication Data

US 2022/0156737 A1 May 19, 2022

Related U.S. Application Data

(63) Continuation of application No. 16/078,625, filed as application No. PCT/IB2017/050825 on Feb. 14, 2017, now Pat. No. 11,182,782.

(30) Foreign Application Priority Data

Feb. 23, 2016 (GB) ..................................... 1603114
Feb. 23, 2016 (GB) ..................................... 1603117
(Continued)

(51) Int. Cl.
  *G06Q 20/38* (2012.01)
  *G06F 16/27* (2019.01)
  (Continued)

(52) U.S. Cl.
  CPC ......... *G06Q 20/3829* (2013.01); *G06F 16/27* (2019.01); *G06Q 20/0655* (2013.01);
  (Continued)

(58) Field of Classification Search
  CPC .. G06Q 20/10; G06Q 20/3829; G06Q 20/223; G06Q 20/0655; G06Q 20/405;
  (Continued)

(56) References Cited

U.S. PATENT DOCUMENTS 5,535,276 A   7/1996 Ganesan
5,600,725 A   2/1997 Rueppel et al.
(Continued)

FOREIGN PATENT DOCUMENTS

AU   2016100059 A4   3/2016
CA      2867765 A1   4/2016
(Continued)

OTHER PUBLICATIONS

Smart Contracts Copyright (c) 1994 by Nick Szabo (Year: 1994).*
(Continued)

*Primary Examiner* — Benjamin A Kaplan
(74) *Attorney, Agent, or Firm* — Tarolli, Sundheim, Covell & Tummino LLP

(57) ABSTRACT

Techniques are presented to control the performance of a process conducted via a blockchain. The method comprises the steps of deriving a public-key-private key cryptographic pair for a portion of data related to a smart contract associated with an asset, wherein the smart contract is stored in a computer-based resource that is separate to the blockchain; deriving a signature for the portion of data using the public key-private key cryptographic pair; and codifying the portion of data to generate codified metadata for the data, wherein the codified metadata is arranged to reference or provide access to the smart contract; transmitting the codified metadata to the blockchain; and receiving a signature and a script from at least one user to enable access to embedded data, wherein the script comprises a public key of a signatory.

17 Claims, 28 Drawing Sheets

(30) Foreign Application Priority Data

| | | | |
|---|---|---|---|
| Feb. 23, 2016 | (GB) | ...................................... | 1603123 |
| Feb. 23, 2016 | (GB) | ...................................... | 1603125 |
| Mar. 11, 2016 | (GB) | ...................................... | 1604225 |
| Apr. 1, 2016 | (GB) | ...................................... | 1605571 |
| Apr. 15, 2016 | (GB) | ...................................... | 1606630 |
| Apr. 26, 2016 | (GB) | ...................................... | 1607249 |
| Nov. 15, 2016 | (GB) | ...................................... | 1619301 |

(51) Int. Cl.

| | |
|---|---|
| *G06Q 20/06* | (2012.01) |
| *G06Q 20/10* | (2012.01) |
| *G06Q 20/22* | (2012.01) |
| *G06Q 20/40* | (2012.01) |
| *H04L 9/06* | (2006.01) |
| *H04L 9/08* | (2006.01) |
| *H04L 9/32* | (2006.01) |
| *H04L 9/00* | (2022.01) |

(52) U.S. Cl.
CPC ........... *G06Q 20/10* (2013.01); *G06Q 20/223* (2013.01); *G06Q 20/405* (2013.01); *H04L 9/0643* (2013.01); *H04L 9/0825* (2013.01); *H04L 9/0861* (2013.01); *H04L 9/3247* (2013.01); *H04L 9/50* (2022.05); *H04L 2209/56* (2013.01)

(58) Field of Classification Search
CPC ..... G06F 16/27; H04L 9/0643; H04L 9/0825; H04L 9/3247; H04L 9/0861; H04L 2209/56; H04L 2209/38; H04L 9/50
USPC ........................................................ 713/176
See application file for complete search history.

(56) References Cited

U.S. PATENT DOCUMENTS

| | | |
|---|---|---|
| 5,761,305 A | 6/1998 | Vanstone et al. |
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,487,660 B1 | 11/2002 | Vanstone et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 7,970,135 B1 | 6/2011 | Schwenk |
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 | 5/2018 | Murphy et al. |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 11,188,907 B1 | 11/2021 | Vijayvergia et al. |
| 11,210,663 B2 | 12/2021 | Voorhees |
| 11,372,455 B2 | 6/2022 | Gauthier, Jr. |
| 11,455,378 B2 | 9/2022 | Wright et al. |
| 11,663,609 B2 | 5/2023 | Christidis et al. |
| 11,727,501 B2 | 8/2023 | Wright |
| 2001/0002486 A1 | 5/2001 | Kocher et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Tikosaka et al. |
| 2004/0193890 A1 | 9/2004 | Girault |
| 2004/0252831 A1 | 12/2004 | Jehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153366 A1 | 7/2006 | Beeson |
| 2006/0153367 A1 | 7/2006 | Beeson |
| 2006/0153368 A1 | 7/2006 | Beeson |
| 2006/0153370 A1 | 7/2006 | Beeson |
| 2006/0156012 A1 | 7/2006 | Beeson |
| 2006/0156013 A1 | 7/2006 | Beeson |
| 2006/0161485 A1 | 7/2006 | Meldahl |
| 2006/0173788 A1 | 8/2006 | Nath Pandya et al. |
| 2006/0179319 A1 | 8/2006 | Krawczyk |
| 2006/0242038 A1 | 10/2006 | Giudilli |
| 2006/0248114 A1 | 11/2006 | Anderson et al. |
| 2007/0055880 A1 | 3/2007 | Lauter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0165955 A1 | 7/2008 | Ibrahim |
| 2008/0195499 A1 | 8/2008 | Meredith et al. |
| 2008/0260143 A1 | 10/2008 | Ibrahim |
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1 | 11/2009 | Rose et al. |
| 2010/0005302 A1 | 1/2010 | Vishnu et al. |

(56) References Cited

U.S. PATENT DOCUMENTS

| | | |
|---|---|---|
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |
| 2011/0208970 A1 | 8/2011 | Brown et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0090026 A1 | 4/2012 | Andrews et al. |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0046792 A1 | 2/2014 | Ganesan |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0132620 A1 | 5/2014 | Kim |
| 2014/0188719 A1 | 7/2014 | Poornachandran et al. |
| 2014/0195425 A1 | 7/2014 | Campos et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0124961 A1 | 5/2015 | Lambert et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0215336 A1 | 7/2015 | Navaraj et al. |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0371224 A1 | 12/2015 | Lingappa |
| 2015/0379510 A1 | 12/2015 | Smith |
| 2015/0381729 A1 | 12/2015 | Manohar et al. |
| 2016/0012465 A1 | 1/2016 | Sharp |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | Mcconaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342984 A1 | 11/2016 | Thomas et al. |
| 2016/0342994 A1 | 11/2016 | Davis |
| 2016/0344543 A1 | 11/2016 | Alness et al. |

(56) References Cited

U.S. PATENT DOCUMENTS

| | | |
|---|---|---|
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1* | 2/2017 | Haldenby .......... G06Q 20/4016 |
| 2017/0046698 A1 | 2/2017 | Haldenby et al. |
| 2017/0046792 A1 | 2/2017 | Haldenby et al. |
| 2017/0046806 A1 | 2/2017 | Haldenby et al. |
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |
| 2017/0103385 A1 | 4/2017 | Wilson, Jr. et al. |
| 2017/0109540 A1 | 4/2017 | Heiman et al. |
| 2017/0116608 A1 | 4/2017 | Forzley et al. |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0154391 A1 | 6/2017 | Watkins et al. |
| 2017/0169403 A1 | 6/2017 | Zhang |
| 2017/0178237 A1 | 6/2017 | Wong |
| 2017/0178263 A1 | 6/2017 | Kraemer et al. |
| 2017/0185527 A1 | 6/2017 | Ueda |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0243214 A1* | 8/2017 | Johnsrud .......... G06Q 40/03 |
| 2017/0250801 A1 | 8/2017 | Chen et al. |
| 2017/0300877 A1 | 10/2017 | Mann et al. |
| 2017/0308580 A1 | 10/2017 | Naganuma et al. |
| 2017/0316390 A1 | 11/2017 | Smith et al. |
| 2017/0324663 A1 | 11/2017 | Menase |
| 2017/0324715 A1 | 11/2017 | Frincu et al. |
| 2018/0025670 A1 | 1/2018 | Karashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0131512 A1 | 5/2018 | Gajek |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0276663 A1 | 9/2018 | Arora |
| 2018/0285840 A1 | 10/2018 | Hasan |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0244186 A1 | 8/2019 | Guo et al. |
| 2019/0266132 A1 | 8/2019 | Rubenstein |
| 2019/0305863 A1 | 10/2019 | Fayyad |
| 2019/0340352 A1 | 11/2019 | Peeters et al. |
| 2019/0349733 A1 | 11/2019 | Nolan et al. |
| 2019/0378139 A1 | 12/2019 | Stribady et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1 | 8/2020 | Padmanabhan |
| 2020/0285935 A1 | 9/2020 | Song et al. |
| 2021/0056070 A1 | 2/2021 | Kakavand et al. |
| 2021/0194677 A1 | 6/2021 | Pourzandi et al. |
| 2021/0304198 A1 | 9/2021 | Lingappa |
| 2021/0409489 A1 | 12/2021 | Speasl et al. |

FOREIGN PATENT DOCUMENTS

| | | |
|---|---|---|
| CN | 1262007 A | 8/2000 |
| CN | 101447980 A | 6/2009 |
| CN | 101477669 A | 7/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104392354 A | 3/2015 |
| CN | 104463001 A | 3/2015 |
| CN | 104620535 A | 5/2015 |
| CN | 104704504 A | 6/2015 |
| CN | 105204802 A | 12/2015 |
| CN | 105306194 A | 2/2016 |
| CN | 105323064 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001069566 A | 3/2001 |
| JP | 2001195479 A | 7/2001 |
| JP | 2002026895 A | 1/2002 |
| JP | 2004192587 A | 7/2004 |
| JP | 2004246882 A | 9/2004 |
| JP | 2004341152 A | 12/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2014068140 A | 4/2014 |
| JP | 2014153583 A | 8/2014 |
| JP | 2015536617 A | 12/2015 |
| JP | 5858506 B1 | 2/2016 |
| JP | 5858507 B1 | 2/2016 |
| JP | 2019512909 A | 5/2019 |
| KR | 20110012085 A | 2/2011 |

(56) References Cited

FOREIGN PATENT DOCUMENTS

| | | | |
|---|---|---|---|
| KR | 101544722 B1 | 8/2015 |
| KR | 101579232 B1 | 1/2016 |
| KR | 20160009716 A | 1/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2015194798 A1 | 12/2015 |
| WO | 2016022864 A2 | 2/2016 |
| WO | 2016137360 A2 | 9/2016 |
| WO | 2016137499 A1 | 9/2016 |
| WO | 2016161073 A1 | 10/2016 |
| WO | 2017006134 A1 | 1/2017 |
| WO | 2017112664 A1 | 6/2017 |

OTHER PUBLICATIONS

Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.

Akutsu et al., "Taking on the challenge of creating epoch-making services that impress users. For services that can share the excitement of competitions around the world," NTT Technical Journal 27(5):10-14, May 1, 2015.

Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.

Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.

Andersen, "Blockchain Technology: A game-changer in accounting?," Deloitte & Touche GmbH Wirtschaftsprüfungsgesellschaft, Mar. 2016, 5 pages.

Andresen et al., "Relay OP_RETURN data TxOut as standard transaction type. #2738," Github, Jun. 4, 2013, https://github.com/bitcoin/bitcoin/pull/2738, 12 pages.

Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.

Anonymous, "Bitcoin Developer Guide," Bitcoin Project, https://web.archive.org/web/20160515171209/https:// bitcoin.org/en/developer-guide, May 15, 2016 [retrieved Mar. 13, 2019], 55 pages.

Anonymous, "Bitcoin Stats," retrieved from http://bitcoinstats.com/irc/bitcoin-dev/logs/2015/03/27, Mar. 27, 2015, 11 pages.

Anonymous, "Bitsquare—The decentralised bitcoin exchange," Bitsquare.io, Jan. 3, 2016 , 14 pages.

Anonymous, "Homepage," website operational as of 2017 [retrieved Nov. 30, 2020], https://www.coinffeine.com/, 2 pages.

Antonopoulos et al., "Bitcoin Book," GitHub, retrieved from https://github.com/bitcoinbook/bitcoinbook, Jun. 8, 2017, 4 pages.

Antonopoulos, "Mastering Bitcoin—Unlocking Digital Cryptocurrencies," O'Reilly Media, Inc., Dec. 20, 2014, 282 pages.

Australian Office Action for Application No. 2017223158, mailed Jun. 22, 2021, 7 pages.

Bitcoin Forum, "Counterparty—Pioneering Peer-to-Peer Finance", https://bitcointalk.org/index.php?topic=395761.0, Feb. 1, 2014, 7 pages.

bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.

Bitfreaki et al, "Understanding Stealth Addresses/Payments," Bitcoin Forum, Jun. 10, 2015 (retrieved Jun. 16, 2020), https://bitcointalk.org/index.php?topic=1086498.0, 8 pages.

Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.

Block_Chan, "Tweet dated Nov. 7, 2018," Twitter, Nov. 7, 2018, https://twitter.com/block_chan/status/1060336404163584000, 1 page.

Bluematt, http://bitcoinstats.com/irc/bitcoin-dev/logs/2015/03/16.

Bradbury, "Developers Battle Over Bitcoin Block Chain," Coindesk, http://www.coindesk.com/developers-battle-bitcoin-block-chain/, Mar. 25, 2014, 3 pages.

Brown et al., "Standards for Efficient Cryptography 1: Elliptic Curve Cryptography Version 2.0," Certicom Research, May 21, 2009, 144 pages.

Brown et al., "Standards for Efficient Cryptography 2: Recommended Elliptic Curve Domain Parameters Version 2.0," Certicom Research, Jan. 27, 2010, 37 pages.

Brown, "On Distributed Satabases and Distributed Ledgers", Thoughts on the Future of Finance, Nov. 8, 2016, https://gendal.me/page/3/, 44 pages.

Burgess et al., "The Promise of Bitcoin and the Blockchain," Consumers' Research, Jul. 13, 2015, 97 pages.

Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.

Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.

Buterin, "Introducing Ethereum Script 2.0", Ethereum Foundation Blog, Feb. 3, 2014, 9 pages.

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.

Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.

Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.

Christidis et al., "Blockchains and Smart Contracts for the Internet of Things," IEEE Access 4(1):2292-2303, May 10, 2016.

Coinprism, "80 bytes Op_Return explained," Coinprism Blog, http://blog.coinprism.com/2015/02/11/80-bytes-op-return/, Feb. 11, 2015 [retrieved Dec. 21, 2018], 8 pages.

Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.

Counterparty, "Home Page," Counterparty, copyright 2018 [retrieved Jan. 13, 2020], counterparty.io, 3 pages.

Countyparty, "The Counterparty Protocol," retrieved from https://github.com/jsimnz/Counterparty/blob/master/README.md, Jan. 8, 2014, 6 pages.

crpit.com, FYJC Mumbai 11th Online Admission 2021-Part-1, 2 Admission Form (mumbai.11thadmission.Org.in), https://crpit.com, Jul. 6, 2021 8 pages.

Danda et al., "hd-wallet-addrs," GitHub, https://github.com/dan-da/hd-wallet-addrs, Dec. 30, 2015 [retrieved Mar. 11, 2016], 7 pages.

Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.

(56) References Cited

OTHER PUBLICATIONS

Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode, "New Kid on the Blockchain," Hacker News, https://news.ycombinator.com/item?id=11372455, Mar. 28, 2016 [Dec. 12, 2018], 32 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2I91/time_to_lobby_bitcoins_core_devs_sf_bitcoin_devs/, Mar. 14, 2015 [Dec. 12, 2018], 21 pages.
Ethereum, "EIP-20: Token Standard," retrieved from https://eips.ethereum.org/EIPS/eip-20, Nov. 19, 2015, 5 pages.
European Communication pursuant to Article 94(3) EPC mailed Jan. 2, 2020, Patent Application No. 18166910.2-1218, filed Feb. 16, 2017, 4 pages.
European Communication pursuant to Article 94(3) EPC mailed Jul. 1, 2019, Application No. 17707121.4-1218, filed Feb. 14, 2017, 6 pages.
Extended European Search Report mailed Jul. 18, 2018, Patent Application No. 18166910.2-1218, filed Feb. 16, 2017, 8 pages.
Familiar et al., "Transcript for #bitcoin-dev 2015/03/27," BitcoinStats, http://bitcoinstats.com/irc/bitcoin-dev/logs/2015/03/27, Mar. 27, 2015 [archived version Jun. 27, 2016], 11 pages.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Franco, "Understanding Bitcoin: Cryptography, Engineering and Economics," Wiley, ISBN: 978-1-119-01916-9, Oct. 2014, 144 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
Fujimura et al., "Bright: A Concept for a Decentralized Rights Management System Based on Blockchain," 2015 IEEE 5th International Conference on Consumer Electronics-Berlin (ICCE-Berlin), Sep. 6, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Github, "Bitcoin/Bips," retrieved from http://web.archive.org/web/20150307191218/https://github.com/bitcoin/bips/blob/master/bip-0016.mediawiki, Apr. 5, 2014, 4 pages.
github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hacker News, "Cryptocontracts Will Turn Contract Law into a Programming Language," retrieved from https://news.ycombinator.com/item?id=7287155, Feb. 23, 2014, 12 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion mailed Apr. 10, 2017, Patent Application No. PCT/IB2017/050861, 11 bages.
International Search Report and Written Opinion mailed Apr. 12, 2017, Patent Application No. PCT/IB2017/050818, 10 bages.
International Search Report and Written Opinion mailed Apr. 12, 2017, Patent Application No. PCT/IB2017/050829, 9 pages.
International Search Report and Written Opinion mailed Apr. 12, 2017, Patent Application No. PCT/IB2017/050866, 10 pages.
International Search Report and Written Opinion mailed Apr. 21, 2017, Patent Application No. PCT/IB2017/050820, 12 pages.
International Search Report and Written Opinion mailed Apr. 26, 2017, International Patent Application No. PCT/IB2017/050865, filed Feb. 16, 2017, 9 pages.
International Search Report and Written Opinion mailed Apr. 3, 2017, Patent Application No. PCT/IB2017/050824, filed Feb. 14, 2017, 13 pages.
International Search Report and Written Opinion mailed Apr. 3, 2017, Patent Application No. PCT/IB2017/050827, 10 pages.
International Search Report and Written Opinion mailed Apr. 3, 2017, Patent Application No. PCT/IB2017/050827, 13 pages.

(56) References Cited

OTHER PUBLICATIONS

International Search Report and Written Opinion mailed Mar. 29, 2017, Patent Application No. PCT/IB2017/050821, 10 pages.
International Search Report and Written Opinion mailed Mar. 29, 2017, Patent Application No. PCT/IB2017/050821, 13 pages.
International Search Report and Written Opinion mailed Mar. 30, 2017, Patent Application No. PCT/IB2017/050819, 13 pages.
International Search Report and Written Opinion mailed Mar. 30, 2017, Patent Application No. PCT/IB2017/050825, 9 pages.
International Search Report and Written Opinion mailed May 29, 2017, International Patent Application No. PCT/IB2017/050815, filed Feb. 14, 2017, 10 pages.
International Search Report and Written Opinion mailed May 31, 2017, Patent Application No. PCT/IB2017/050856, filed Feb. 16, 2017, 11 pages.
International Search Report and Written Opinion mailed May 31, 2017, Patent Application No. PCT/IB2017/050867, 11 pages.
International Search Report and Written Opinion mailed May 31, 2017, Patent Application No. PCT/IB2017/050979, filed Feb. 21, 2017, 11 pages.
International Search Report and Written Opinion mailed May 31, 2017, Patent Application No. PCT/IB2017/050980, 12 pages.
Japanese Notice of Reason(s) for Rejection mailed Mar. 30, 2021, Patent Application No. 2018-539890, 8 pages.
Japanese Notice of Reason(s) for Rejection mailed Mar. 30, 2021, Patent Application No. 2018-539893, 6 pages.
Japanese Office Action mailed Feb. 16, 2021, Patent Application No. 2018-539331, 7 pages.
Japanese Office Action mailed Jan. 22, 2019, Patent Application No. 2018-516682, filed Feb. 16, 2017, 14 pages.
Japanese Office Action mailed Oct. 6, 2020, Patent Application No. 2018-539865, 14 pages.
Japanese Office Action mailed Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
White, "How Computers Work," Que Publishing 7th Edition, Oct. 15, 2003, 44 pages.
Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.
Wikipedia, "Counterparty (platform)," Wikipedia the Free Encyclopedia, last edited Dec. 6, 2019 [retrieved Jan. 13, 2020], https://en.wikipedia.org/wiki/Counterparty_(platform), 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
I2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78 (1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0; all, Jun. 18, 2011 [retrieved Dec. 10, 2018], 104 pages.
Mccorry et al., "Authenticated Key Exchange over Bitcoin, " International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.

(56) References Cited

OTHER PUBLICATIONS

Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat et al., "Blockchain Electronic Vote," retrieved from https://www.weusecoins.com/assets/pdf/library/blockchain-electronic-vote.pdf, Apr. 29, 2015, 9 pages.
Noizat, "Handbook of Digital Currency Chapter 22: Blockchain Electronic Vote," Elsevier Inc., David Lee Kuo Chuen (ed.), May 2015, 9 pages.
NXT, "Voting," nxt.org, website archived on Feb. 18, 2016 [retrieved May 31, 2022], https://web.archive.org/web/20160218021746/https://nxt.org/what-is-nxt/voting/, 3 pages.
Openchain, "Home Page," openchain.org, Dec. 22, 2015 [retrieved May 8, 2020], https://web.archive.org/web/20151222083734/https://www.openchain.org/, 18 pages.
Openssl Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
Openssl Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Rockwell, "BitCongress—Process for Blockchain Voting & Law," retrieved from http://generalbitcoin.com/BitCongress_Whitepaper.pdf, Feb. 12, 2016, 8 pages.

Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Marketplaces," GitHub, Jun. 10, 2015 [retrieved May 12, 2020], https://github.com/drwasho/openbazaar-documentation/blob/master/04%20Marketplaces.md, 37 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https://gist.github.com/drwasho/a5380544c170bdbbbad8, Jan. 2016, 12 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Satoshi et al., "Connection Limits," Bitcoin Forum, Aug. 9, 2010, https://bitcointalk.org/index.php?topic=741.0;prev_next=prev, 2 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action mailed Apr. 12, 2021, Patent Application No. 109142412, 5 pages.
Taiwanese Office Action mailed Jul. 28, 2020, Patent Application No. 106105709, 9 pages.
Taiwanese Office Action mailed Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report mailed Apr. 25, 2016, Patent Application No. 11603117.1, filed Feb. 23, 2016, 11 pages.
UK Commercial Search Report mailed Feb. 17, 2017, Patent Application No. 1604493.5, 8 pages.

(56) References Cited

OTHER PUBLICATIONS

UK Commercial Search Report mailed Jan. 13, 2017, Patent Application No. 1604498.4, 8 pages.
UK Commercial Search Report mailed Jun. 14, 2016, Patent Application No. 1607249.8, 4 pages.
UK Commercial Search Report mailed Jun. 27, 2016, Patent Application No. GB1603123.9, filed Feb. 23, 2016, 11 pages.
UK Commercial Search Report mailed Jun. 27, 2016, Patent Application No. GB1603125.4, filed Feb. 23, 2016, 11 pages.
UK Commercial Search Report mailed Jun. 28, 2016, Patent Application No. GB1603122.1, filed Feb. 23, 2016, 12 pages.
UK Commercial Search Report mailed Jun. 6, 2016, Patent Application No. 1604497.6, filed Mar. 16, 2016, 6 pages.
UK Commercial Search Report mailed Jun. 9, 2016, Patent Application No. GB1603114.8 , 4 pages.
UK Commercial Search Report mailed Jun. 9, 2016, Patent Application No. GB1603117.1, filed Feb. 23, 2016, 12 pages.
UK Commercial Search Report mailed May 16, 2016, Patent Application No. GB1603125.4, 8 pages.
UK Commercial Search Report mailed May 20, 2016, Patent Application No. 1605026.2, 4 pages.
UK Commercial Search Report mailed May 24, 2016, Patent Application No. GB1605571.7, filed Apr. 1, 2016, 3 pages.
UK Commercial Search Report mailed May 9, 2016, Patent Application No. GB1603112.2, 6 pages.
UK Commercial Search Report mailed May 9, 2016, Patent Application No. GB1603114.8, filed Feb. 23, 2016, 2 pages.
UK Commercial Search Report mailed Nov. 14, 2016, Patent Application No. GB1607063.3, 8 pages.
UK Commercial Search Report mailed Nov. 30, 2016, Patent Application No. 1607058.3, filed Apr. 22, 2016, 7 pages.
UK Commercial Search Report mailed Oct. 10, 2016, Patent Application No. GB1607484.1, filed Apr. 29, 2016, 5 pages.
UK Commercial Search Report mailed Sep. 30, 2016, Patent Application No. 1606630.0, filed Apr. 15, 2016, 7 pages.
UK Expanded Commercial Search Report mailed Jun. 15, 2016, Patent Application No. 1605026.2, 5 pages.
UK IPO Search Report mailed Dec. 12, 2016, Patent Application No. GB1606630.0, filed Apr. 15, 2016, 4 pages.
UK IPO Search Report mailed Dec. 15, 2016, Patent Application No. GB1607063.3, 6 pages.
UK IPO Search Report mailed Dec. 21, 2016, Patent Application No. GB1607058.3, 3 pages.
UK IPO Search Report mailed Dec. 21, 2016, Patent Application No. GB1607058.3, filed Apr. 22, 2016, 3 pages.
UK IPO Search Report mailed Dec. 23, 2016, Patent Application No. GB1604495.0, 5 pages.
UK IPO Search Report mailed Dec. 28, 2016, Patent Application No. GB1604497.6, filed Mar. 16, 2016, 4 pages.
UK IPO Search Report mailed Dec. 5, 2016, Patent Application No. 1607249.8, 4 pages.
UK IPO Search Report mailed Dec. 6, 2016, Patent Application No. 1604493.5, 6 pages.
UK IPO Search Report mailed Dec. 6, 2016, Patent Application No. 1607482.5, 5 pages.
UK IPO Search Report mailed Jan. 25, 2017, Patent Application No. 1605026.2, 3 pages.
UK IPO Search Report mailed Jan. 3, 2017, Patent Application No. 1604498.4, 4 pages.
UK IPO Search Report mailed Jul. 26, 2016, Patent Application No. GB1603114.8, filed Feb. 23, 2016, 5 pages.
UK IPO Search Report mailed Jul. 4, 2016, Patent Application No. GB1603125.4, filed Feb. 23, 2016, 6 pages.
UK IPO Search Report mailed Jul. 5, 2016, Patent Application No. GB1603123.9, filed Feb. 23, 2016, 5 pages.
UK IPO Search Report mailed Oct. 17, 2016, Patent Application No. GB1603117.1, filed Feb. 23, 2016, 5 pages.
UK IPO Search Report mailed Oct. 21, 2016, Patent Application No. GB1603112.2, 4 pages.
UK IPO Search Report mailed Oct. 26, 2016, Patent Application No. GB1603122.1, filed Feb. 23, 2016, 4 pages.
UK IPO Search Report mailed Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action mailed Sep. 27, 2018, Patent Application No. 1-2018-03358, filed Feb. 16, 2017, 2 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
International Search Report and Written Opinion mailed Aug. 3, 2018, Patent Application No. PCT/IB2018/053289, 10 pages.
UK Commercial Search Report mailed Jun. 12, 2017, Patent Application No. GB510912, 6 pages.
UK IPO Search Report mailed Oct. 9, 2017, Patent Application No. GB1707788.4, 6 pages.
Drwasho, "Openbazaar Documentation", Github, Jun. 2015, 53 pages.
Bluematt, "Contract", Bitcoin Wiki, Oct. 22, 2015, 12 pages.
UK IPO Search Report mailed Dec. 21, 2016, Patent Application No. GB1607484.1, 4 pages.
Gutoski et al., "Hierarchical Deterministic Bitcoin Wallets That Tolerate Key Leakage", Lecture Notes in Computer Science book series (LNSC, vol. 8975), Jan. 1, 2015, 9 pages.
Mirzadeh et al., "CPFP: An Efficient Key Management Scheme for Large Scale Personal Networks", IEEE, 2008, 6 pages.
Menezes et al., "Handbook of Applied Cryptography," CRC Press, Oct. 16, 1996, 811 pages.
Deloitte, "Blockchain Technology A Game-changer in Accounting", Mar. 2016, 5 pages.
Lazarovich, Amir, "Invisible Ink: Blockchain for Data Privacy", May 8, 2015, 85 pages.
Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.
Subramanian, et al., "The State of Cryptocurrencies, Their Issues and Policy Interactions", International Information Management Association, vol. 24, No. 24, No. 3, 2015, pp. 25-40.
Greenspan, Dr. Gideon, "MultiChain Private Blcokchain", White Paper, Jun. 2015, 17 pages.
Swanson, Tim, "Watermarked Tokens and Pseudonymity on Public Blockchains", Nov. 4, 2015, 78 pages.
Manabu Takata et al., "Nikkei BP Mook, FinTech Revolution, Financial Common Sense Dissolved by Technology", Nikkei Business Publications, Inc., Jan. 27, 2016, ISBN: 978-4-8222-7188-6, pp. 44-47.
Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.
Bitfury Group, "Public Versus Private Blockchains", Part 2: Permissionless Blackchains, in collaboration with Jeff Garzik, Version 1.0, Oct. 20, 2015, 20 pages.
Gauthierdickey, et al. "Secure Peer-to-Peer Trading in Small and Large Scale Multiplayer Games", Multimedia Systems, Apr. 29, 2014, 13 pages.
Feng et al., "A Next Generation Cryptocurrency Platform Ethereum and Its Evaluation", Oct. 14, 2015, 12 pages.
Ramaswami, U., et al., "Genotype and Phenotype in Hypochondroplasia", 1998, Mosby, Inc., 5 pages.
UK Commercial Search Report mailed Jan. 18, 2017, Patent Application No. GB510135, filed Mar. 16, 2016, 5 pages.
Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.

(56) References Cited

OTHER PUBLICATIONS

The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 pages.

Antonopoulos, "Mastering Bitcoin, Chapter 4, Keys, Addresses, Wallets", O'Reilly, Dec. 20, 2014, 34 pages.

Omnilayer, Omni Protocol Specification (formerly Mastercoin), retrieved from https://github.com/OmniLayer/spec/blob/9978cc3984ae0b6e51216c4ae74042fc4097b993/README.md on Apr. 19, 2024, 58 pages.

Vroblefski et al., "Managing User Relationships in Hierarchies for Information System Security", Science Direct, Decision Support System 43, 2007, 12 pages.

Wikipedia, "Diffie-Hellman Key Exchange," retrieved from https://en.wikipedia.org/w/index.php?title=Diffie%E2%80%93Hellman_key_exchange&oldid=759611604, Jan. 2017, 10 pages.

Nikkei Business Publications, Inc., "Blockchain & Bitcoin", 2016, 4 pages.

Bitcoin Wiki, "Contract," Bitcoin Wiki, https://en.bitcoin.it/w/index.php?title=Contract&oldid=59172, May 22, 2011 (updated dated Oct. 22, 2015) [retrieved Jan. 8, 2024], 2 pages.

The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 p.

Fromknecht Conner, et al., "A Decentralized Public Key Infrastructure with Identity Retention" Nov. 11, 2024, 16 pages.

Buterin, "Ethereum White Paper", A Next Generation Smart Contract & Decentralized Application Platform, 2014, 36 pages.

* cited by examiner

| Colin's Setup | |
|---|---|
| COLIN-S1-T1 | Transaction-ID |
| Version number | Version number |
| 1 | Number of inputs |
| <Colin's previous unspent BTC output - assume 500,000 satoshi> | Prev Trans Output |
| IDX-00 | Prev Trans Output index |
| Script length | Script length |
| Sig-Colin PubK-Colin | ScriptSig |
| Sequence number | Sequence number |
| 1 | Number of outputs |
| 105,000 | Output value |
| Output script length | Output script length |
| OP_DUP OP_HASH160 <PubK-Asset Hash> OP_EQUALVERIFY OP_CHECKSIG | Output script |
| 394,000 | Output value |
| Output script length | Output script length |
| OP_DUP OP_HASH160 <PubK-Colin Hash> OP_EQUALVERIFY OP_CHECKSIG | Output script |
| LockTime | LockTime |

Fig. 3

| Asset's Offer | |
|---|---|
| ASSET-S1-T1 | Transaction-ID |
| Version number | Version number |
| 1 | Number of inputs |
| COLIN-S1-T1 | Prev Trans Output |
| IDX-00 | Prev Trans Output index |
| Script length | Script length |
| Sig-Asset PubK-Asset | ScriptSig |
| Sequence number | Sequence number |
| 1 | Number of outputs |
| 104,000 | Output value |
| Output script length | Output script length |
| OP_HASH160 <redeem script hash> OP_EQUAL | Output script |
| <set to the deadline specified (midnight 31-Dec-2016), expressed as UnixTime> | LockTime |
| | |
| ASSET-S1-T2 | Transaction-ID |
| Version number | Version number |
| 1 | Number of inputs |
| ASSET-S1-T1 | Prev Trans Output |
| IDX-00 | Prev Trans Output index |
| Script length | Script length |
| Sig-Asset <OP_1 AssetMetadataA AssetMetadataB InvestmentMetadataA InvestmentMetadataB PubK-Asset OP_5 OP_CHECKMULTSIG> | ScriptSig |
| Sequence number | Sequence number |
| 1 | Number of outputs |
| 103,000 | Output value |
| Output script length | Output script length |
| OP_DUP OP_HASH160 <PubK-Asset Hash> OP_EQUALVERIFY OP_CHECKSIG | Output script |
| <set to the deadline specified (midnight 31-Dec-2016), expressed as UnixTime> | LockTime |

Fig. 4

| Colin's Bid | |
|---|---|
| COLIN-S1-T2 | Transaction-ID |
| Version number | Version number |
| 1 | Number of inputs |
| <Colin's previous unspent BTC output - assume 1000 BTC satoshi> | Prev Trans Output |
| IDX-00 | Prev Trans Output index |
| Script length | Script length |
| Sig-Colin PubK-Colin | ScriptSig |
| Sequence number | Sequence number |
| 2 | Number of outputs |
| 51,000,000,000 | Output value |
| Output script length | Output script length |
| OP_HASH160 <redeem script hash> OP_EQUAL | Output script |
| 48,999,999,000 | Output value |
| Output script length | Output script length |
| OP_DUP OP_HASH160 <PubK-Colin> OP_EQUALVERIFY OP_CHECKSIG | Output script |
| LockTime | LockTime |

Fig. 5

| Bob's Bid | |
|---|---|
| BOB-S1-T1 | Transaction-ID |
| Version number | Version number |
| 1 | Number of inputs |
| <Bob's previous unspent BTC output - assume 1000 BTC satoshi> | Prev Trans Output |
| IDX-00 | Prev Trans Output index |
| Script length | Script length |
| Sig-Bob PubK-Bob | ScriptSig |
| Sequence number | Sequence number |
| 2 | Number of outputs |
| 23,000,000,000 | Output value |
| Output script length | Output script length |
| OP_HASH160 <redeem script hash> OP_EQUAL | Output script |
| 76,999,999,000 | Output value |
| Output script length | Output script length |
| OP_DUP OP_HASH160 <PubK-Bob> OP_EQUALVERIFY OP_CHECKSIG | Output script |
| LockTime | LockTime |

Fig. 6

| Mary's Bid | |
|---|---|
| MARY-S1-T1 | Transaction-ID |
| Version number | Version number |
| 1 | Number of inputs |
| <Mary's previous unspent BTC output - assume 1000 BTC satoshi> | Prev Trans Output |
| IDX-00 | Prev Trans Output index |
| Script length | Script length |
| Sig-Mary PubK-Mary | ScriptSig |
| Sequence number | Sequence number |
| 2 | Number of outputs |
| 9,000,000,000 | Output value |
| Output script length | Output script length |
| OP_HASH160 <redeem script hash> OP_EQUAL | Output script |
| 90,999,999,000 | Output value |
| Output script length | Output script length |
| OP_DUP OP_HASH160 <PubK-Mary> OP_EQUALVERIFY OP_CHECKSIG | Output script |
| LockTime | LockTime |

Fig. 7

| Frank's Bid | |
|---|---|
| FRANK-S1-T1 | Transaction-ID |
| Version number | Version number |
| 1 | Number of inputs |
| <Frank's previous unspent BTC output - assume 1000 BTC satoshi> | Prev Trans Output |
| IDX-00 | Prev Trans Output index |
| Script length | Script length |
| Sig-Frank PubK-Frank | ScriptSig |
| Sequence number | Sequence number |
| 2 | Number of outputs |
| 17,000,000,000 | Output value |
| Output script length | Output script length |
| OP_HASH160 <redeem script hash> OP_EQUAL | Output script |
| 82,999,999,000 | Output value |
| Output script length | Output script length |
| OP_DUP OP_HASH160 <PubK-Mary> OP_EQUALVERIFY OP_CHECKSIG | Output script |
| LockTime | LockTime |

Fig. 8

| Asset Issue Investment | |
|---|---|
| ASSET-S1-T3 | Transaction-ID |
| Version number | Version number |
| 5 | Number of inputs |
| ASSET-S1-T2 | Prev Trans Output |
| IDX-00 | Prev Trans Output index |
| Script length | Script length |
| Sig-Colin PubK-Colin | ScriptSig |
| COLIN-S1-T2 | Prev Trans Output |
| IDX-00 | Prev Trans Output index |
| Script length | Script length |
| Sig-Asset Sig-Facilitator <OP_2 AssetMetadataA AssetMetadataB InvestmentMetadataA InvestmentMetadataB PubK-Asset PubK-Facilitator OP_5 OP_CHECKMULTSIG> | ScriptSig |
| BOB-S1-T1 | Prev Trans Output |
| IDX-00 | Prev Trans Output index |
| Script length | Script length |
| Sig-Asset Sig-Facilitator <OP_2 AssetMetadataA AssetMetadataB InvestmentMetadataA InvestmentMetadataB PubK-Asset PubK-Facilitator OP_5 OP_CHECKMULTSIG> | ScriptSig |
| MARY-S1-T1 | Prev Trans Output |
| IDX-00 | Prev Trans Output index |
| Script length | Script length |
| Sig-Asset Sig-Facilitator <OP_2 AssetMetadataA AssetMetadataB InvestmentMetadataA InvestmentMetadataB PubK-Asset PubK-Facilitator OP_5 OP_CHECKMULTSIG> | ScriptSig |
| FRANK-S1-T1 | Prev Trans Output |
| IDX-00 | Prev Trans Output index |
| Script length | Script length |

Fig. 9

| | |
|---|---|
| Sig-Asset Sig-Facilitator <OP_2 AssetMetadataA AssetMetadataB InvestmentMetadataA InvestmentMetadataB PubK-Asset PubK-Facilitator OP_5 OP_CHECKMULTSIG> | ScriptSig |
| Sequence number | Sequence number |
| 6 | Number of outputs |
| 51,000 | Output value |
| Output script length | Output script length |
| OP_HASH160 <redeem script hash> OP_EQUAL | Output script |
| 23,000 | Output value |
| Output script length | Output script length |
| OP_HASH160 <redeem script hash> OP_EQUAL | Output script |
| 9,000 | Output value |
| Output script length | Output script length |
| OP_HASH160 <redeem script hash> OP_EQUAL | Output script |
| 17,000 | Output value |
| Output script length | Output script length |
| OP_HASH160 <redeem script hash> OP_EQUAL | Output script |
| 10,000,000,000 | Output value |
| Output script length | Output script length |
| OP_DUP OP_HASH160 <PubK-Colin> OP_EQUALVERIFY OP_CHECKSIG | Output script |
| 2,000 | Output value |
| Output script length | Output script length |
| OP_DUP OP_HASH160 <PubK-Asset Hash> OP_EQUALVERIFY OP_CHECKSIG | Output script |
| LockTime | LockTime |

Fig. 9
(continued)

| Colin's Investment Return Funding | |
|---|---|
| COLIN-S1-T3 | Transaction-ID |
| Version number | Version number |
| 1 | Number of inputs |
| <Colin's previous unspent BTC output - assume 100 BTC satoshi> | Prev Trans Output |
| IDX-00 | Prev Trans Output index |
| Script length | Script length |
| Sig-Colin PubK-Colin | ScriptSig |
| Sequence number | Sequence number |
| 2 | Number of outputs |
| 1,000,001,000 | Output value |
| Output script length | Output script length |
| OP_DUP OP_HASH160 <PubK-Asset> OP_EQUALVERIFY OP_CHECKSIG | Output script |
| 8,999,998,000 | Output value |
| Output script length | Output script length |
| OP_DUP OP_HASH160 <PubK-Colin> OP_EQUALVERIFY OP_CHECKSIG | Output script |
| LockTime | LockTime |

Fig. 10

| Asset's Investment Return | |
|---|---|
| ASSET-S1-T4 | Transaction-ID |
| Version number | Version number |
| 1 | Number of inputs |
| COLIN-S1-T3 | Prev Trans Output |
| IDX-00 | Prev Trans Output index |
| Script length | Script length |
| Sig-Asset PubK-Asset | ScriptSig |
| Sequence number | Sequence number |
| 4 | Number of outputs |
| 510,000,000 | Output value |
| Output script length | Output script length |
| OP_HASH160 <redeem script hash> OP_EQUAL | Output script |
| 230,000,000 | Output value |
| Output script length | Output script length |
| OP_HASH160 <redeem script hash> OP_EQUAL | Output script |
| 90,000,000 | Output value |
| Output script length | Output script length |
| OP_HASH160 <redeem script hash> OP_EQUAL | Output script |
| 170,000,000 | Output value |
| Output script length | Output script length |
| OP_HASH160 <redeem script hash> OP_EQUAL | Output script |
| LockTime | LockTime |

Fig. 11

| Field | Sub-field | Bytes | Value | Comments |
|---|---|---|---|---|
| Asset Metadata A | ContractType | 4 | 0x0000FF04 | Indicates unit |
| | ContractPointer | 16 | xxxx.xxxx.xxxx.xxxx (...) xxxx | Address of the *Asset Definition* file |
| | Padding | 12 | | Spare |
| Asset Metadata B | ContractHash | 20 | ############... | Hash of the *Asset Definition* file (not the tokenisation!) |
| | Juristiction | 2 | EN | Specifies that the asset is covered by English law |
| | Options | 2 | 0x0000 | No options specified |
| | Padding | 8 | | Spare |
| Invest Metadata A | ContractType | 4 | 0x0000FF03 | Indicates unit |
| | ContractPointer | 16 | xxxx.xxxx.xxxx.xxxx (...) xxxx | IPv6 address of the *Investment* file (not the tokenisation!) |
| | OfferRequestCode | 1 | | |
| | NumberShares | 8 | | Hex value defining the number of shares |
| | Conditions | 1 | 00000000₂ | No conditions |
| | PeggingRate | 1 | | Coded value represents the BTC/share pegging rate |
| | AssetLinkage | 1 | 0x02 | Shared ownership of |
| Invest Metadata B | ContractHash | 20 | ############... | Hash of the *Investment* file (not the tokenisation!) |
| | Juristiction | 2 | EN | Specifies that the contract is governed under English law |
| | Options | 1 | | |
| | ReturnUnit | 1 | | |
| | ReturnPeriod | 4 | | |
| | ReturnGap | 1 | | |
| | Spare | 3 | | |

Fig 12

| Jane's Purchase from Bob | |
|---|---|
| JANE-S2-T1 | Transaction-ID |
| Version number | Version number |
| 1 | Number of inputs |
| <Jane's previous BTC account, assume 200 BTC> | Prev Trans Output |
| IDX-00 | Prev Trans Output index |
| Script length | Script length |
| Sig-Jane PubK-Jane | ScriptSig |
| Sequence number | Sequence number |
| 2 | Number of outputs |
| 12,000,000,000 | Output value |
| Output script length | Output script length |
| OP_HASH160 <redeem script hash> OP_EQUAL | Output script |
| 7,999,999,000 | Output value |
| Output script length | Output script length |
| OP_DUP OP_HASH160 <PubK-Jane> OP_EQUALVERIFY OP_CHECKSIG | Output script |

Fig. 13

| Bob's transfer of asset to Jane | |
|---|---|
| BOB-S2-T1 | Transaction-ID |
| Version number | Version number |
| 2 | Number of inputs |
| ASSET-S1-T3 | Prev Trans Output |
| IDX-01 | Prev Trans Output index |
| Script length | Script length |
| Sig-Bob Sig-Asset <OP_2 AssetMetaDataA AssetMetadataB InvestmentMetadataA InvestmentMetadataB PubK-Bob PubK-Asset OP_6 OP_CHECKMULTISIG> | ScriptSig |
| <Bob's regular BTC account (to pay mining fee) - assume 10000 satochi> | Prev Trans Output |
| IDX-00 | Prev Trans Output index |
| Script length | Script length |
| Sig-Bob PubK-Bob | ScriptSig |
| Sequence number | Sequence number |
| 3 | Number of outputs |
| 10,000 | Output value |
| Output script length | Output script length |
| OP_HASH160 <redeem script hash> OP_EQUAL | Output script |
| 13,000 | Output value |
| Output script length | Output script length |
| OP_HASH160 <redeem script hash> OP_EQUAL | Output script |
| 9,000 | Output value |
| Output script length | Output script length |
| OP_DUP OP_HASH160 <PubK-Bob> OP_EQUALVERIFY OP_CHECKSIG | Output script |

Fig. 14

| Asset's Investment Return | |
|---|---|
| ASSET-S2-T1 | Transaction-ID |
| Version number | Version number |
| 1 | Number of inputs |
| COLIN-S2-T1 | Prev Trans Output |
| IDX-00 | Prev Trans Output index |
| Script length | Script length |
| Sig-Asset PubK-Asset | ScriptSig |
| Sequence number | Sequence number |
| 5 | Number of outputs |
| 510,000,000 | Output value |
| Output script length | Output script length |
| OP_HASH160 <redeem script hash> OP_EQUAL | Output script |
| 130,000,000 | Output value |
| Output script length | Output script length |
| OP_HASH160 <redeem script hash> OP_EQUAL | Output script |
| 90,000,000 | Output value |
| Output script length | Output script length |
| OP_HASH160 <redeem script hash> OP_EQUAL | Output script |
| 170,000,000 | Output value |
| Output script length | Output script length |
| OP_HASH160 <redeem script hash> OP_EQUAL | Output script |
| 100,000,000 | Output value |
| Output script length | Output script length |
| OP_HASH160 <redeem script hash> OP_EQUAL | Output script |
| LockTime | LockTime |

Fig. 15

| Field | Sub-field | Bytes | Value | Comments |
|---|---|---|---|---|
| Asset Metadata A | ContractType | 4 | 0x0000FF04 | Indicates unit |
| | ContractPointer | 16 | xxxx.xxxx.xxxx.xxxx (...) .xxxx | Address of the *Asset Definition* file |
| | Padding | 12 | | Spare |
| Asset Metadata B | ContractHash | 20 | ############... | Hash of the *Asset Definition* file (not the tokenisation!) |
| | Juristiction | 2 | EN | Specifies that the asset is covered by English law |
| | Options | 2 | 0x0000 | No options specified |
| | Padding | 8 | | Spare |
| Invest Metadata A | ContractType | 4 | 0x0000FF03 | Indicates unit |
| | ContractPointer | 16 | xxxx.xxxx.xxxx.xxxx (...) .xxxx | IPv6 address of the *Investment* file (not the tokenisation!) |
| | OfferRequestCode | 1 | | |
| | NumberShares | 8 | | Hex value defining the number of shares |
| | Conditions | 1 | (00000000) | No conditions |
| | PeggingRate | 1 | | Coded value represents the BTC/share pegging rate |
| | AssetLinkage | 1 | 0x01 | Investment secured against |
| Invest Metadata B | ContractHash | 20 | ############... | Hash of the *Investment* file (not the tokenisation!) |
| | Juristiction | 2 | EN | Specifies that the contract is governed under English law |
| | Options | 1 | | |
| | ReturnUnit | 1 | | |
| | ReturnPeriod | 4 | | |
| | ReturnGap | 1 | | |
| | Spare | 3 | | |

Fig. 16

| Field | Sub-field | Bytes | Value | Comments |
|---|---|---|---|---|
| House Metadata A | ContractType | 4 | 0x0000FF04 | Indicates unit |
| | ContractPointer | 16 | xxxx.xxxx.xxxx.xxxx (...) .xxxx | Address of the Asset *Definition* file |
| | Padding | 12 | | Spare |
| House Metadata B | ContractHash | 20 | ############... | Hash of the Asset *Definition* file (not the tokenisation!) |
| | Juristiction | 2 | EN | Specifies that the asset is covered by English law |
| | Options | 2 | 0x0000 | No options specified |
| | Padding | 8 | | Spare |
| Invest Metadata A | ContractType | 4 | 0x0000FF03 | Indicates unit |
| | ContractPointer | 16 | xxxx.xxxx.xxxx.xxxx (...) .xxxx | IPv6 address of the *Investment* file (not the tokenisation!) |
| | OfferRequestCode | 1 | | |
| | NumberShares | 8 | | Hex value defining the number of shares |
| | Conditions | 1 | 00000000; | No conditions |
| | PeggingRate | 1 | | Coded value represents the BTC/share pegging rate |
| | AssetLinkage | 1 | 0x02 | Shared ownership of |
| Invest Metadata B | ContractHash | 20 | ############... | Hash of the *Investment* file (not the tokenisation!) |
| | Juristiction | 2 | EN | Specifies that the contract is governed under English law |
| | Options | 1 | | |
| | ReturnUnit | 1 | 0x01 | Calendar month |
| | ReturnPeriod | 4 | 0x00 | Uncapped period (e.g. the investment has no end date) |
| | ReturnGap | 1 | 0x06 | Returns every 6 months |
| | Spare | 3 | | |

Fig. 17

| Property Creation | |
|---|---|
| BLAR-54-T1 | Transaction-ID |
| Version number | Version number |
| 1 | Number of inputs |
| <BLAH's previous unspent BTC output - assume 500,000 satoshi> | Prev Trans Output |
| IDX-00 | Prev Trans Output index |
| Script length | Script length |
| Sig-BLAR PubK-BLAR | ScriptSig |
| Sequence number | Sequence number |
| 5 | Number of outputs |
| 1,000 | Output value |
| Output script length | Output script length |
| OP_HASH160 <redeem script hash> OP_EQUAL | Output script |
| 1,000 | Output value |
| Output script length | Output script length |
| OP_HASH160 <redeem script hash> OP_EQUAL | Output script |
| 1,000 | Output value |
| Output script length | Output script length |
| OP_HASH160 <redeem script hash> OP_EQUAL | Output script |
| 1,000 | Output value |
| Output script length | Output script length |
| OP_HASH160 <redeem script hash> OP_EQUAL | Output script |
| 495,000 | Output value |
| Output script length | Output script length |
| OP_DUP OP_HASH160 <PubK-BLAR Hash> OP_EQUALVERIFY OP_CHECKSIG | Output script |
| LockTime | LockTime |

Fig. 18

| House 1 Sale to Alice | |
|---|---|
| NTDL-S4-T1 | Transaction-ID |
| Version number | Version number |
| 2 | Number of inputs |
| BLAR-S4-T1 | Prev Trans Output |
| IDX-00 | Prev Trans Output index |
| Script length | Script length |
| Sig-NTDL Sig-BLAR OP_2 House1MetadataA House1MetadataB PubK-NTDL PubK-BLAR OP_4 OP_CHECKMULTISIG | ScriptSig |
| <BLAH's previous unspent BTC output - assume 500,000 satoshi> | Prev Trans Output |
| IDX-00 | Prev Trans Output index |
| Script length | Script length |
| Sig-BLAR PubK-BLAR | ScriptSig |
| Sequence number | Sequence number |
| 1 | Number of outputs |
| 1,000 | Output value |
| Output script length | Output script length |
| OP_HASH160 <redeem script hash> OP_EQUAL | Output script |
| 499,000 | Output value |
| Output script length | Output script length |
| OP_DUP OP_HASH160 <PubK-BLAR Hash> OP_EQUALVERIFY OP_CHECKSIG | Output script |
| LockTime | LockTime |

Fig. 19

| Rental Investment Product Creation | |
|---|---|
| SP-S4-T1 | Transaction-ID |
| Version number | Version number |
| 1 | Number of inputs |
| <SP's previous unspent BTC output - assume 500,000 satoshi> | Prev Trans Output |
| IDX-00 | Prev Trans Output index |
| Script length | Script length |
| Sig-SP PubK-SP | ScriptSig |
| Sequence number | Sequence number |
| 2 | Number of outputs |
| 100,000 | Output value |
| Output script length | Output script length |
| OP_HASH160 <redeem script hash> OP_EQUAL | Output script |
| 399,000 | Output value |
| Output script length | Output script length |
| OP_DUP OP_HASH160 <PubK-SP Hash> OP_EQUALVERIFY OP_CHECKSIG | Output script |
| LockTime | LockTime |

Fig. 20

| Rental Investment Product Creation | |
|---|---|
| SP-S4-T2 | Transaction-ID |
| Version number | Version number |
| 1 | Number of inputs |
| <SP's previous unspent BTC output - assume 500,000 satoshi> | Prev Trans Output |
| IDX-00 | Prev Trans Output index |
| Script length | Script length |
| Sig-SP PubK-SP | ScriptSig |
| Sequence number | Sequence number |
| 2 | Number of outputs |
| 200,000 | Output value |
| Output script length | Output script length |
| OP_DUP OP_HASH160 <PubK-Alice Hash> OP_EQUALVERIFY OP_CHECKSIG | Output script |
| 299,000 | Output value |
| Output script length | Output script length |
| OP_DUP OP_HASH160 <PubK-SP Hash> OP_EQUALVERIFY OP_CHECKSIG | Output script |
| LockTime | LockTime |

Fig. 21

| Alice Onsells her Investment | |
|---|---|
| ALICE-S4-T1 | Transaction-ID |
| Version number | Version number |
| 2 | Number of inputs |
| SP-S4-T1 | Prev Trans Output |
| IDX-00 | Prev Trans Output index |
| Script length | Script length |
| Sig-Alice Sig-SP OP_2 House1MetadataA House1MetadataB InvestMetadata1 InvestMetadata2 PubK-Alice PubK-SP OP_6 OP_CHECKMULTISIG | ScriptSig |
| <Alice's previous unspent BTC output - assume 500,000 satoshi> | Prev Trans Output |
| IDX-00 | Prev Trans Output index |
| Script length | Script length |
| Sig-Alice PubK-Alice | ScriptSig |
| Sequence number | Sequence number |
| 4 | Number of outputs |
| 51,000 | Output value |
| Output script length | Output script length |
| OP_HASH160 <redeem script hash> OP_EQUAL | Output script |
| 29,000 | Output value |
| Output script length | Output script length |
| OP_HASH160 <redeem script hash> OP_EQUAL | Output script |
| 200,000 | Output value |
| Output script length | Output script length |
| OP_HASH160 <redeem script hash> OP_EQUAL | Output script |
| 299,000 | Output value |
| Output script length | Output script length |
| OP_DUP OP_HASH160 <PubK-Alice Hash> OP_EQUALVERIFY OP_CHECKSIG | Output script |
| LockTime | LockTime |

Fig. 22

| Rental Investment Product Creation | |
|---|---|
| SP-S4-T3 | Transaction-ID |
| Version number | Version number |
| 1 | Number of inputs |
| <SP's previous unspent BTC output - assume 500,000 satoshi> | Prev Trans Output |
| IDX-00 | Prev Trans Output index |
| Script length | Script length |
| Sig-SP PubK-SP | ScriptSig |
| Sequence number | Sequence number |
| 4 | Number of outputs |
| 102,000 | Output value |
| Output script length | Output script length |
| OP_DUP OP_HASH160 <PubK-Alice Hash> OP_EQUALVERIFY OP_CHECKSIG | Output script |
| 58,000 | Output value |
| Output script length | Output script length |
| OP_DUP OP_HASH160 <PubK-Bob Hash> OP_EQUALVERIFY OP_CHECKSIG | Output script |
| 40,000 | Output value |
| Output script length | Output script length |
| OP_DUP OP_HASH160 <PubK-Eve Hash> OP_EQUALVERIFY OP_CHECKSIG | Output script |
| 299,000 | Output value |
| Output script length | Output script length |
| OP_DUP OP_HASH160 <PubK-SP Hash> OP_EQUALVERIFY OP_CHECKSIG | Output script |
| LockTime | LockTime |

Fig. 23

TOKENISATION METHOD AND SYSTEM FOR IMPLEMENTING EXCHANGES ON A BLOCKCHAIN

This invention relates generally to a tokenisation method and corresponding system for the exchange of entities or assets via a computer-implemented network, and control thereof. It relates to security mechanisms for exchanges and transfers on a network. In particular, it relates to the transfer of contracts. It may be suited for use with, but not limited to, a non-debt lending process. It may be used in conjunction with any peer-to-peer distributed network. This may be blockchain-related technology, including (but not limited to) the Bitcoin Blockchain.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is an electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

The present invention incorporates various technical concepts to provide a blockchain-based mechanism and infrastructure which enables lending between different parties. This can be achieved without the presence of debt. Lending is an integral part of the financial services marketplace, allowing borrowers to receive funds from lenders in return for subsequent payment of those advanced funds. Traditional lending via a financial institution such as a bank has, in recent years, been extended through peer-to-peer (P2P) lending where individuals lend pooled finds to a borrower in general for a higher individual return, but with increased risk of loss of the advanced funds.

There are a number of P2P pools with their own bespoke trading exchanges requiring individual registration onto those applications in order to participate in the P2P lending process (e.g. Zopa, Funding circle). These loans are underpinned and implemented upon the traditional banking network and technical infrastructure within the territory in which they operate. Therefore, the present systems for P2P lending are restrictive and complex by nature.

It would be advantageous to provide an alternative solution. Benefits of this solution could include, for example, elimination of the need for local bespoke exchanges whilst enabling sophisticated lending processes to be carried out. Known benefits of the blockchain (such as its tamper-proof, permanent record of transactions) could be harnessed to advantage. This solution would provide an entirely new architecture and technical platform. Such an improved solution has now been devised.

Thus, in accordance with the present invention there is provided a method and system as defined in the appended claims.

Therefore, in accordance with the invention there may be provided a method and corresponding system for controlling the performance of a process conducted via (i.e. using) a blockchain. The block chain may or may not be the Bitcoin blockchain. The process may be a lending process. The invention may also incorporate tokenisation and cryptographic techniques which provide enhanced security to the transfer of a digital asset or item.

The invention may provide a blockchain-implemented method. It may provide a mechanism for embedding data. The data may be embedded in a blockchain transaction (Tx). Additionally or alternatively, it may comprise a method for the control, exchange and/or transfer of an asset or item. This may be a digital asset. Additionally or alternatively, it may provide a tokenisation method. The asset and/or contract may be tokenised.

It may comprise the steps:

deriving a public-key-private key cryptographic pair for an item or portion of data;

deriving a signature for the data using the public key-private key cryptographic pair; or codifying the data to generate codified metadata for the data.

The data may relate to an asset or entity, or may relate to a (smart) contract associated with the asset. The smart contract may be stored in a computer-based resource, which may be separate to the blockchain.

The invention may be arranged to control a transfer made via a blockchain in respect of an asset or representation of an asset. The asset or representation may comprise or be associated with one or more private cryptographic keys, each private key being associated with an owner/controller of the asset. The private key(s) may part of a cryptographic key pair. One or more of the private keys may be generated according to a technique substantially as described below in the section entitled "generating a public key for an Asset". One or more keys may be generated using a common secret. It may be a sub-key which is generated from a master cryptographic key.

The invention may comprise the allocation or generation of an address and/or cryptographic key for an asset. It may also comprise the allocation and/or generation of an address and/or cryptographic key for an owner or controller of the asset, or some other entity associated with the asset. The address/key for the asset and/or controller be created using the deterministic sub-key process defined below in the section entitled "Generating a public key for an asset". In one or more embodiments, the address may be a blockchain address. Preferably, it is generated as a sub-address derived from a master address (key). The master key may belong to, or be associated with, the controller/owner of the asset. The use of the sub-key generation technique may allow direct interaction between an asset and an owner, in a secure manner which is cryptographically enforced. It may also enable the ability to nest or structure, possibly in a hierarchical manner, multiple (smart) contracts, each being controlled by a respective computing resource, within the same blockchain transaction.

The invention may comprise a technique for determining a secret which is common to a first and a second entity. The entity may be referred to as a node, or an asset. The first or second entity may be an asset and the other entity may be a controller or other entity associated with the asset. The invention may comprise a method substantially as described below in the section entitled "generating a public key for an Asset." This method may comprise the steps:

Determining a first entity second private key based on at least a first entity master private key and a generator value;

Determining a second entity second private key based on at least a second entity master private key and the generator value;

Determining a common secret (CS) at the first entity based on the first entity second private key and the second entity second public key, and determining the common secret (CS) at the second entity based on the second entity second private key and first entity second public key; and wherein the first entity second public key and the second entity second public key are respectively based on at least the first/second entity master key and the generator value.

The method may further comprise the step of transmitting the codified metadata to the blockchain. The codified metadata may be arranged so as to reference or provide access to a contract. This may be a smart contract as known in the art. The metadata may be codified substantially in accordance with a codification scheme as described below in the section entitled "Codification Scheme". It may comprise three parameters or data items relating to:

1) a number of shares available under the contract;
2) A quantity of transfer units or value items to be transferred from one party to another; these may be units of a cryptocurrency; or
3) A factor for calculating a value for the quantity of transfer units.

The method may further comprise the step of receiving a signature and a script from at least one user to enable access to the embedded data. The script may comprise a public key of a signatory. The term "user" can refer to a human user or a computer-implemented resource or agent.

The metadata may comprise a hash of the data. The metadata may comprise a pointer or other reference to the data. This may allow the data to be referenced and/or accessed. Thus, the data may be stored "off-block," i.e., not in the blockchain.

The hash may be used as a primary key in a lookup table where the data is stored. This may be a DHT.

The method may also comprise a blockchain-implemented system. The system may be operative to:

derive a public-key-private-key cryptographic pair for the data;

derive a signature for the data using the public key-private key cryptographic pair; or codify the data to generate codified metadata for the data.

The system may be arranged to implement any embodiment of the method above.

The system may be operative to transmit the codified metadata to the blockchain.

The system may be operative to receive a signature and a script from at least one user to enable access to the embedded metadata. The script may comprise a public key of a signatory.

The system may be operative to generate a hash of the data and to store that hash as part of the metadata.

The system may be operative to generate a pointer or other reference to the data. The system may be operative to store the hash as a primary key in a lookup table where the data is stored.

Additionally or alternatively, one or more embodiments of the invention may comprise a method for the generation of one or more cryptographic keys. This may be substantially as described below in the section entitled "Generating a public key for an asset". It may comprise the following steps:

determining, at a first node (C), a common secret (CS) that is common with the first node (C) and a second node (S), wherein the first node (C) is associated with a first asymmetric cryptography pair having a first node master private key ($V_{1C}$) and a first node master public key ($P_{1C}$), and the second node (S) is associated with a second asymmetric cryptography pair having a second node master private key ($V_{1S}$) and a second node master public key ($P_{1S}$), wherein the method comprises:

determining a first node second private key ($V_{2C}$) based on at least the first node master private key ($V_{1C}$) and a deterministic key (DK);

determining a second node second public key ($P_{2S}$) based on at least the second node master public key ($P_{1S}$) and the deterministic key (DK); and determining the common secret (CS) based on the first node second private key ($V_{2C}$) and the second node second public key ($P_{2S}$), wherein the second node (S) has the same common secret (S) based on a first node second public key ($P_{2C}$) and a second node second private key ($V_{2S}$), wherein:

the first node second public key ($P_{2C}$) is based on at least the first node master public key ($P_{1C}$) and the deterministic key (DK); and the second node second private key ($V_{2S}$) is based on at least the second node master private key ($V_{1S}$) and the deterministic key (DK).

The deterministic key (DK) may be based on a message (M). The method may also comprise the steps of:

generating a first signed message (SM1) based on the message (M) and the first node second private key ($V_{2C}$); and sending, over the communications network, the first signed message (SM1) to the second node (S), wherein the first signed message (SM1) can be validated with a first node second public key ($P_{2C}$) to authenticate the first node (C).

Preferably, the method may comprise the steps of:
receiving, over the communications network, a second signed message (SM2) from the second node (S);
validating the second signed message (SM2) with the second node second public key (P2S); and
authenticating the second node (S) based on the result of validating the second signed message (SM2),
wherein the second signed message (SM2) was generated based on the message (M), or a second message (M2), and the second node second private key ($V_{2S}$).

Preferably, the method may comprise the steps of:
generating a message (M); and
sending, over a communications network, the message (M) to the second node (S).

Preferably, the method may comprise the steps of:
receiving the message (M), over the communications network, from the second node (S).

Preferably, the method may comprise the steps of:
receiving the message (M), over the communications network, from another node.

Preferably, the method may comprise the steps of:
receiving the message (M) from a data store, and/or an input interface associated with the first node (C).

Preferably, the first node master public key ($P_{1C}$) and second node master public key ($P_{1S}$) may be based on elliptic curve point multiplication of respective first node master private key ($V_{1C}$) and second node master private key ($V_{1S}$) and a generator (G).

Preferably, the method may comprise the steps of:
receiving, over the communications network, the second node master public key (P1S); and
storing, at a data store associated with the first node (C), the second node master public key (P1S).

Preferably, the method may comprise the steps of:
generating, at a first node (C), the first node master private key (V1C) and the first node master public key (P1C);
sending, over the communications network, the first node master public key (P1C) to the second node (S) and/or other node; and
storing, in a first data store associated with the first node (C), the first node master private key (V1C).

Preferably, the method may comprise the steps of:
sending, over the communications network, to the second node, a notice indicative of using a common elliptic curve cryptography (ECC) system with a common generator (G) for the method of determining a common secret (CS), and wherein the step of generating the first node master private key ($V_{1C}$) and the first node master public key ($P_{1C}$) comprises:

generating the first node master private key ($V_{1C}$) based on a random integer in an allowable range specified in the common ECC system; and determining the first node master public key ($P_{1C}$) based on elliptic curve point multiplication of the first node master private key ($V_{1C}$) and the common generator (G) according to the following formula:

$$P_{1C} = V_{1C} \times G.$$

Preferably, the method may comprise the steps of:
determining the deterministic key (DK) based on determining a hash of the message (M), and wherein the step of determining a first node second private key (V2C) is based on a scalar addition of the first node master private key ($V_{1C}$) and the deterministic key (DK) according to the following formula:

$$V_{2C} = V_{1C} + DK, \text{ and}$$

wherein the step of determining a second node second public key (P2S) is based on the second node master public key ($P_{1S}$) with elliptic curve point addition to the elliptic curve point multiplication of the deterministic key (DK) and the common generator (G) according to the following formula:

$$P_{2S} = P_{1S} + DK \times G.$$

Preferably, the deterministic key (DK) may be based on determining a hash of a previous deterministic key.

The first asymmetric cryptography pair and the second asymmetric cryptography pair may be based on a function of respective previous first asymmetric cryptography pair and previous second asymmetric cryptography pair.

Any feature described above in relation to one embodiment or aspect may be used in relation to any other aspect or embodiment.

These and other aspects of the present invention will be apparent from and elucidated with reference to, the embodiment described herein.

An embodiment of the present invention will now be described, by way of example only, and with reference to the accompany drawings, in which:

FIG. 1 illustrates a P2P network comprising a plurality of computing devices;

FIG. 2*a* illustrates the relative positioning of the parties involved with the system;

FIGS. 2*b* to 2*f* illustrate the generation of a public-key for an asset;

FIG. 3 illustrates a set-up transaction for Scenario 1;

FIG. 4 illustrates the offer of the investment by Colin as a transaction;

FIGS. 5 to 8 illustrate bids on the investment by Colin, Bob, Mary and Frank;

FIG. 9 illustrates a transaction which details the issuance of the raised funds to Colin as well as the issuance of the issued units to the investors;

FIG. 10 illustrates the generation of returns on the investment by Colin;

FIG. 11 illustrates the generation of returns to Colin, Bob, Mary and Frank;

FIG. 12 illustrates the metadata generated by the system for the asset;

FIG. 13 illustrates a transaction characterising Jane's purchase from Bob;

FIG. 14 illustrates a transaction which issues the ownership to Jane from Bob;

FIG. 15 illustrates a transaction which enables the return on Jane's asset to be returned by the generated asset;

FIG. 16 illustrates asset metadata in respect of a second investment generated against an asset;

FIG. 17 illustrates asset metadata in respect of the establishment of an estate comprising houses;

FIG. 18 illustrates a transaction which creates the property on the blockchain;

FIG. 19 illustrates a transaction in which the first house is released to Alice;

FIG. 20 illustrates a transaction in which Alice generates rental income from the first house;

FIG. 21 illustrates a transaction which enables a return to be paid on an investment;

FIG. 22 illustrates a transaction which enables Alice to sell a part of her investment; and FIG. 23 illustrates a transaction which enables rental income to be generated by the investment.

Figure 1:
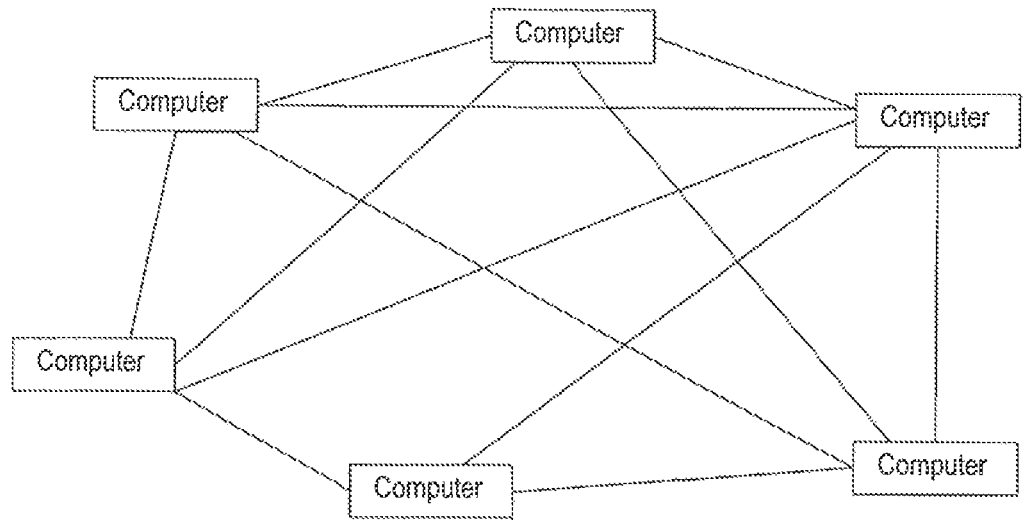

One or more embodiments of the invention may enable the ultimate owner of a property or other asset to borrow funds against that asset. This can be achieved in a manner which does not require the return to the investors to be determined through the payment of interest, making it compliant with non-interest forms of lending.

By tokenising the asset, it is possible to separate the ownership of the asset from the asset's use. Thus, the owner (or "controller") and their asset become two separate entities within the present invention. As a result, the owner can use, control and manage the asset in a more powerful and flexible way e.g., they can contract it out to other parties.

In order to achieve this, the invention may comprise the use of a separate address for the asset from the owner. This can be created using the deterministic sub-key process defined below in the section entitled "Generating a public key for an asset". In one or more embodiments, the address is a blockchain address. Preferably, it is generated as a sub-address derived from a master address (key). The master key may belong to, or be associated with, the controller/owner of the asset.

Furthermore, a smart contract is generated which implements a contract structure. The smart contract allows others to bid on an investment in the asset. Additional smart contracts can also be registered against the property/asset and recorded on the Blockchain such as, for example, somebody renting the property themselves, providing a particular service related to the property or the facilitation of a financial investment in the property. Investors in the property can then receive returns or pay the costs associated with the upkeep of the property.

The invention enables the ultimate owner of an asset (or the majority of the current owners of the contract if that is how the terms of the contract are structured) to:

Represent their asset on the Blockchain in a manner that allows their ownership to be hidden if so desired; thus, anonymity is provided for network users Sell, transfer or exchange all or part of their share of the asset to another investor;

Allow the trading of that asset between investors at a price set by the open market without reference to the ultimate owner;

Allow the asset ownership to generate a return payable to the current investors;

Allow the asset to recoup its costs from the current investors;

Buy back the investments (subject to the terms of the original investment contract itself); and Raise addition investment against the asset either through increasing the total number of units in existence (akin to a rights issue) or by creating an additional investment against the asset.

The following benefits may be realised by a system in accordance with the invention.

Investors with limited funds can invest in property in a way that negates the need for a Fixed Unit Trust or Real Estate Investment Trust (REIT). This is because the owner of the property stipulates in the smart contract what bids are acceptable. It is then up to the investor to decide if the investment is for them. Depending on the specifics of the contract, it can allow a smaller investor access to investments not easily available using the traditional investment methods; and Investors with an ethical or religious belief that prevents them from investing in a scheme with a usury, can do so because all the returns are published up front in the smart contract. As such it is 100% transparent up front what the financial returns will be.

A system which may be used to implement the embodiment may comprise a P2P network as illustrated in FIG. 1. FIG. 1 illustrates a plurality of computers which are configured to form a P2P network.

A blockchain is a P2P network with a distributed architecture which shares work and tasks between interconnected computing devices which are known as "nodes" or "peers". Such a network is decentralised in that no individual computer is designated as being "in charge". Recent years have witnessed the use of P2P networks for the implementation of the consensus-based Bitcoin Blockchain and Bitcoin inspired variations.

Nomenclature

The following terms have been used herein and may be construed in accordance with the following meanings:

| Name | Type |
| --- | --- |
| Owner | Defines the actor that owns the Asset which will underpin the investment |
| Asset | Defines the asset which will create the investment product. |
| Investor | Defines an actor (there can be more than one instance of this actor within any given scenario) that wishes to purchase units within an investment product. |
| Secondary Investor | Defines an actor (there can be more than one instance of this actor within any given scenario) that wishes to purchase units for an investment product from an existing investor. |
| Repository | The Repository is an actor, which may be an individual or corporate entity, which acts as a trusted repository for any documents. |
| Document | The Document is an abstract entity that contains structured information about the investment or asset process |
| Rule | This is a specialised type of Document that contains the formal definition of the rule that determines how to calculate one or more return against an investment. |

| Name | Type |
| --- | --- |
| Asset Definition | This is a specialised type of Document that contains the definition of the underlying Asset |
| Investment Contract | This is a specialised type of Document that contains the definition of the investment contract |
| Facilitator | The Facilitator is an actor, which may be an individual or corporate entity, which acts as an intermediary between the Investor(s) and Asset(s) in the arrangement, or ongoing management of the Investment. |

Figure 2A:
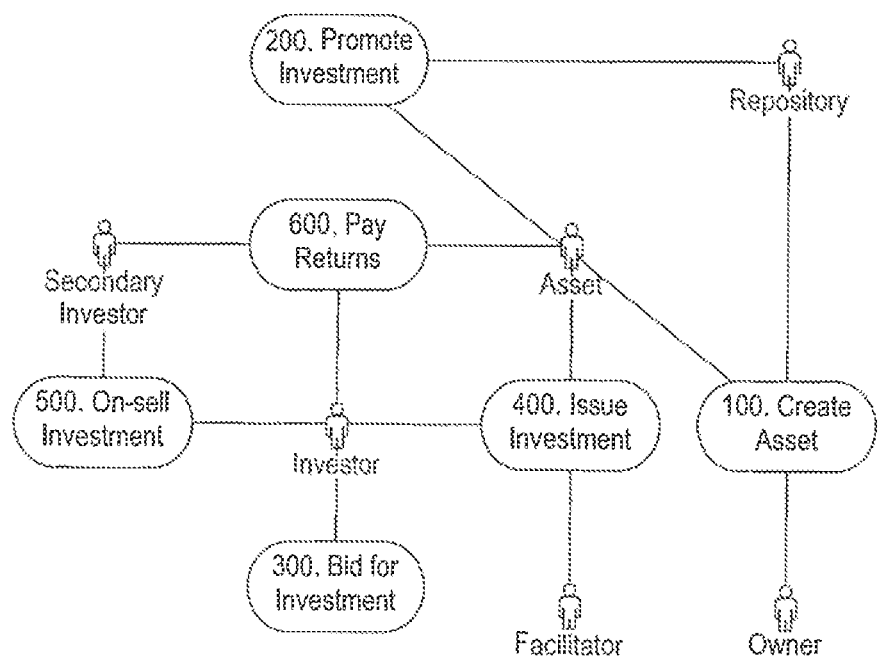

The relative positioning of these individuals in the use of the described system is illustrated in FIG. 2a.

Although the invention is described in the context of the purchase of property this is not intended to be limiting and it is to be understood that the invention can be used advantageously for a variety of purposes or applications, and provides a variety of technical benefits.

Scenario 1—Property Purchase

FIGS. 3 to 8 illustrate the process by which a buyer named Colin purchases a property costing 1000 BTC.

FIG. 3 illustrates a transaction which enables Colin to set up the purchase of the property. This acts as a seed transaction which enables the invitation to be initiated.

Colin wishes to purchase a property costing 1000 BTC using a unit trust arrangement with other investors. Colin generates transaction metadata using a suitably programmed computing (client) device.

The transaction is constructed in such a way that the transaction metadata sets out details of the property and makes no mention of the owner or of the share that he owns.

The transaction metadata sets out that the buyer will put up 51% of the purchase cost, thereby holding a controlling interest, but raise the additional 49% from investors. In return for this investment, each of the investors will get a 'rental' income every six months linked to the current market rate. The transaction metadata is published to a blockchain as a transaction as set out in FIG. 4.

The system generates a smart contract detailing the:
Total size of the investment pot (1000 BTC)
The number of units (100) plus the 'face' value of those units (10 BTC)
The fact that the investment is uncapped (e.g. there is no termination date defined)
There is a break clause that can be triggered at any point with the 'face' value of the units returned to the investors (to cover Colin selling the property)
The return conditions, of a return plus the calculation rules every six months.

A total of four investors put up the required 1000 BTC investment. One of those investors is Colin (the de-facto owner who puts up the majority stake to ensure that he continues to control the underlying asset). The other investors are: Bob who puts up 230 BTC of the required 1000 BTC investment; Mary who puts up 90 BTC of the required 1000 BTC investment; and Frank who puts up 170 BTC of the required 1000 BTC investment. The number of units are allocated proportionally to Colin (51 Units), Bob (23 Units), Mary (9 Units) and Frank (17 Units) by the system. The transactions illustrating the bids from Colin, Bob, Mary and Frank are illustrated in FIGS. 5 to 8.

The asset issues the raised funds to Colin in transaction ID ASSET S1-T3 as illustrated in FIG. 9. ASSET S1-T3 receives each of the transactions set out in FIGS. 5 to 8 as an input and the units are issued to Colin, Bob, Mary and Frank in the output of ASSET S1-T3.

That is to say, the transaction ASSET-S1-T3 performs two functions within the same transaction. It firstly consolidates and passes the raised funds to Colin and simultaneously issues units in the asset to the investors Colin, Bob, Mary and Frank.

For Colin to unlock his output from ASSET S1-T3, he must sign the hash of the redeem script:
OP_2 AssetMetaDataA AssetMetadataB InvestmentMetadataA InvestmentMetadataB PubK-Colin PubK-Asset OP_6 OP_CHECKMULTISIG For Bob to unlock his output from ASSET S1-T3, he must sign the hash of the redeem script:
OP_2 AssetMetaDataA AssetMetadataB InvestmentMetadataA InvestmentMetadataB PubK-Bob PubK-Asset OP_6 OP_CHECKMULTISIG For Mary to unlock her output from ASSET S1-T3, she must sign the hash of the redeem script:
OP_2 AssetMetaDataA AssetMetadataB InvestmentMetadataA InvestmentMetadataB PubK-Mary PubK-Asset OP_6 OP_CHECKMULTISIG For Frank to unlock his output from ASSET S1-T3, he must sign the hash of the redeem script:
OP_2 AssetMetaDataA AssetMetadataB InvestmentMetadataA InvestmentMetadataB PubK-Frank PubK-Asset OP_6 OP_CHECKMULTISIG Periodically, the asset will generate returns on the underlying investment that will be calculated at a per share return and then scaled up to cover the individual ownership. The current ownership position can be maintained directly by the Asset, or derived by scanning the asset transactions on the Blockchain from the base issuance transaction generated by the Asset (ASSET-S1-T3). For this scenario, it is assumed that Colin (the owner of the asset) will provide the funds to return to the investors using transaction ID colin-S1-T3, as illustrated in FIG. 10, which generates an output which is used as an input (COLIN S1-T3 with output index IDX-00) to transaction ASSET S1-T3 to generate the returns as is illustrated in FIG. 11. This doesn't have to be the case—in practice the source of those funds can be anything but importantly it is the Asset's responsibility to calculate and pay the return.

Colin can spend his return by signing the hash of redeem script:
OP_1 AssetMetaDataA AssetMetadataB InvestmentMetadataA InvestmentMetadataB PubK-Colin OP_5 OP_CHECKMULTISIG Bob can spend his return by signing the hash of redeem script:
OP_1 AssetMetaDataA AssetMetadataB InvestmentMetadataA InvestmentMetadataB PubK-Bob OP_5 OP_CHECKMULTISIG Mary can spend her return by signing the hash of redeem script:
OP_1 AssetMetaDataA AssetMetadataB InvestmentMetadataA InvestmentMetadataB PubK-Mary OP_5 OP_CHECKMULTISIG Frank can spend his return by signing the hash of redeem script:
OP_1 AssetMetaDataA AssetMetadataB InvestmentMetadataA InvestmentMetadataB PubK-Frank OP_5 OP_CHECKMULTISIG Scenario 2—Sale of Units In this example, Bob decides to sell 10 of the units he acquired in Scenario 1 and negotiates a price of 12 BTC per unit. The spreadsheet shows this as a bilateral transaction between himself and Jane.

In this situation, there is a transaction between two investors, which results in the following occurring:

| Investor | Investment Returned | Investment Amount | Units Assigned |
|---|---|---|---|
| Bob | 120 BTC | | −10 |
| Jane | | 120 BTC | 10 |
| | 120 BTC | 120 BTC | 0 |

This leaves the state of the holdings as follows (assuming that Jane paid the market rate):

| Investor | Original Investment | Current Valuation | Current Units |
|---|---|---|---|
| Colin | 510 BTC | 612 BTC | 51 |
| Bob | 230 BTC | 156 BTC | 13 |
| Mary | 90 BTC | 108 BTC | 9 |
| Frank | 170 BTC | 204 BTC | 17 |
| Jane | 120 BTC | 120 BTC | 10 |
| | | 1200 BTC | 100 |

The system generates the asset metadata for the asset which enables it to trade the units that Bob would like to sell. The metadata is illustrated in FIG. 12.

A purchase transaction is then generated which enables Jane to purchase the units from Bob that he would like to sell. This transaction (transaction ID JANE-S2-T1) is illustrated in FIG. 13.

In order to spend the output from this transaction, Bob needs to sign a hash of redeem script:
OP_2 AssetMetaDataA AssetMetadataB InvestmentMetadataA InvestmentMetadataB PubK-Bob PubK-Asset OP_6 OP_CHECKMULTISIG Note that this differs from the original investment detailed in Scenario 1 in that the payment is to an account controlled by Bob rather than one managed on behalf of the underlying asset itself.

A transaction detailing the transfer of the units to Jane from Bob is illustrated in FIG. 14 with transaction ID BOB-S2-T1. In order to spend the first output a hash of the following redeem script will need to be signed:
OP_2 AssetMetaDataA AssetMetadataB InvestmentMetadataA InvestmentMetadataB PubK-Jane PubK-Asset OP_6 OP_CHECKMULTISIG In order to spend the second output a hash of the following redeem script will need to be signed:
OP_2 AssetMetaDataA AssetMetadataB InvestmentMetadataA InvestmentMetadataB PubK-Bob PubK-Asset OP_6 OP_CHECKMULTISIG The asset will, periodically, generate returns on the underlying investment that will be calculated at a per share return and then scaled up to cover the individual ownership. The current ownership position can be maintained directly by the Asset, or derived by scanning the asset transactions on the Blockchain from the base issuance transaction generated by the Asset (transaction ID ASSET-S1-T3). For this scenario, it is assumed that Colin (the owner of the asset) will provide the funds to return to the investors; this doesn't have to be the case—in practice the source of those funds can be anything but importantly it is the Asset's responsibility to calculate and pay the return.

The generation of returns by the asset is illustrated in the transaction set out in FIG. 15 with transaction ID ASSET S2-T1. Transaction ID COLIN-S2-T1 is used as an input to transaction ID ASSET S2-T1 which generates 5 outputs in the form of returns for each of the 5 investors.

In order to spend the return from the first output, Colin will need to provide a signed hash of the redeem script:
OP_1 AssetMetaDataA AssetMetadataB InvestmentMetadataA InvestmentMetadataB PubK-Colin OP_5 OP_CHECKMULTISIG In order to spend the return from the second output, Bob will need to provide a signed hash of the redeem script:
OP_1 AssetMetaDataA AssetMetadataB InvestmentMetadataA InvestmentMetadataB PubK-Bob OP_5 OP_CHECKMULTISIG In order to spend the return from the third output, Mary will need to provide a signed hash of the redeem script:
OP_1 AssetMetaDataA AssetMetadataB InvestmentMetadataA InvestmentMetadataB PubK-Mary OP_5 OP_CHECKMULTISIG In order to spend the return from the fourth output, Frank will need to provide a signed hash of the redeem script:
OP_1 AssetMetaDataA AssetMetadataB InvestmentMetadataA InvestmentMetadataB PubK-Frank OP_5 OP_CHECKMULTISIG In order to spend the return from the fifth output, Jane will need to provide a signed hash of the redeem script:
OP_1 AssetMetaDataA AssetMetadataB InvestmentMetadataA InvestmentMetadataB PubK-Jane OP_5 OP_CHECKMULTISIG That is to say, the system enables the asset to generate returns automatically using a Blockchain transaction.

Scenario 3—Home Improvement

The system enables the creation of a second investment against an existing asset. In this situation, the owners collectively decide to arrange for energy efficiency upgrades to be applied to the property. There are two ways of funding this:

Additional units would be offered, prioritising existing investors first in proportion to their holding (this is how a traditional rights issue would operate).

A new investment would be created that returned a percentage of the energy savings to those investors (e.g. 50% of the saving on the property's energy cost will be paid annually).

It is this second option that would require a second investment on the same asset. (You may implement the first one in a similar manner, but in practice re-issuance of the original investment with the additional units is a more efficient method of achieving the same objective.

In terms of transaction flow, Scenario 3 is a straight repeat of Scenario 1 with different InvestmentMetadata blocks to define the new investment properties.

The system generates asset investment metadata. The asset investment metadata is illustrated in FIG. 16. Resulting transactions are identical to those illustrated by FIGS. 3 to 11, but clearly with the investment metadata illustrated by FIG. 16.

Scenario 4—Full Life Cycle

The scenario is initiated by Colin who has a desire to raise 490 BTC against a house valued at 1000 BTC. A first investor, Bob, wishes to invest 230 BTC. A second investor, Mary, wishes to invest 90 BTC. A third investor, Frank, wishes to invest 170 BTC. The asset needs to issue 100 shares with a nominal value of 10 BTC each.

A company named Blockchain Law Associates Ltd have set up a subsidiary called BLA Registrar Ltd (or, BLAR for short). BLAR are offering a new online Blockchain based service for title deed registrations and guarantee that their processes and documents conform to all relevant laws and regulation in their jurisdiction. Furthermore they are licensed by the official State Registrar to store and manage title deeds on their behalf.

To implement this, Blockchain Law Associated Ltd creates a new sub-key for BLAR. The sub-key generation may be performed substantially in accordance with the method described below in the section entitled "generating a public key for an asset".

NewTech Developers Ltd (NTDL) build a new housing estate and contract BLAR to store all the title deeds on BLAR's registry. For each house in the estate, BLAR:
 (i) Creates the title deed in the form of a contract stored on a DHT in accordance with the smart contract codification scheme as described above.
 (ii) Issues a token representing the title deed as a Bitcoin transaction to a pay-to-script-hash (P2SH), where the locking script contains the contract metadata (DHT location plus look-up hash) as well as the public keys of both BLAR and NTDL.

At this point, each property on the estate has a UTXO representing it on the Blockchain as shown in transaction BLAR-S4-T1.

BLAR-S4-T1 is the initial transaction to create the contract for each property on the estate. In this example there are only four properties but it is to be understood that this is illustrative and that the description herein could be applied to an estate with any number of properties.

The metadata fields used by the asset are illustrated in FIG. 17 where the asset investment metadata for the housing estate is depicted.

The initial transaction to create the contract for each property on the estate is shown in FIG. 18. It should be noted that each of the four properties has different metadata although, in this example anyway, the underlying structure of the metadata is the same for each of the four properties.

BLAR-S4-T1 generates 5 outputs, i.e. one for each of the properties and a miner's fee.

In order for the first output to be spent, the system requires a signed hash of the following redeem script:
OP_2 House1MetadataA House1MetadataB PubK-NTDL PubK-BLAR OP_4 OP_CHECKMULTISIG In order for the second output to be spent, the system requires a signed hash of the following redeem script:
OP_2 House2MetadataA House2MetadataB PubK-NTDL PubK-BLAR OP_4 OP_CHECKMULTISIG In order for the third output to be spent, the system requires a signed hash of the following redeem script:
OP_2 House3MetadataA House3MetadataB PubK-NTDL PubK-BLAR OP_4 OP_CHECKMULTISIG In order for the fourth output to be spent, the system requires a signed hash of the following redeem script:
OP_2 House4MetadataA House4MetadataB PubK-NTDL PubK-BLAR OP_4 OP_CHECKMULTISIG The system is then operative to update the DHT (in a separate field from the contract) with the unhashed version of the locking script of the transaction (i.e. showing the public keys and the metadata blocks). As a registrar, BLAR will also need to maintain KYC information against their customers (currently NTDL) which will be maintained in an internal database.

Alice buys a newly built house from NTDL and as part of that exchange the title deed is re-registered to Alice, by transferring the token to her nominated public key as well as to BLAR's public key in another P2SH transaction. The Contract (and thus look-up hash) remains unchanged, however, BLAR again update the 'ownership' field on the DHT with the unhashed version of the locking script (this time showing Alice's public key instead of NTDL's). BLAR also update any internal KYC database with Alice's details. At this point, the UTXO representing the ownership of the property by NTDL is spent into a new UTXO controlled by Alice. This is shown in transaction NTDL-S4-T1 in FIG. 19.

The system is then operative to generate a further transaction which enables the first house (transaction output reference BLAR-S4-T1, that is the first output from the transaction illustrated in FIG. 18) to be released into the ownership of Alice. For the purposes of this example, the purchase transaction itself occurred in fiat currency and isn't shown. However, the transaction to issue the property rights is illustrated in FIG. 19.

In order for the property rights to be issued to Alice, Alice must provide a signed hash of the following redeem script:
OP_2 House1MetadataA House1MetadataB PubK-Alice PubK-BLAR OP_4 OP_CHECKMULTISIG The system enables Alice to generate an investment product using service provider SP secured against the rental income for the house. The ownership of the house does not transfer to another party. The initial allocation of the house is back to Alice herself.

The system generates a transaction in respect of the investment product generated by Alice using the system. The transaction is illustrated in FIG. 20.

Alice lives in the house but she also gets some rent by letting out the spare rooms. She also wants to raise some capital so she decides to create an investment secured against this rental income with the return to investors being a proportion of the rental received.

Her service provider (SP) issues a limited, divisible contract with 100 shares in the income generated by the house. The contract specifies all the terms and conditions including rental income and upkeep on a pro-rata basis with an escrow service contracted to facilitate the investment.

When the investment is initially created, all 100 shares are issued back to Alice for onward divestment. The locking script associated with this investment includes the metadata associated with the house, the metadata associated with the investment plus the public key of the service provider and the public key for Alice.

At this point, a UTXO representing the ownership of the investment by Alice is created. This is shown in transaction SP-S4-T1 shown in FIG. 20.

In order to realise the initial asset allocation back to Alice, Alice must provide a signed hash of the following redeem script:
OP_2 House1MetadataA House1MetadataB InvestMetadata1 InvestMetadata2 PubK-Alice PubK-SP OP_6 OP_CHECKMULTISIG The product generates returns and the system generates a transaction to enable the returns to be paid out to Alice. The transaction is illustrated in FIG. 21.

The transaction (ID SP-S4-T2) illustrated in FIG. 21 has two outputs. The first output requires a hash of the public key of Alice and the second output requires a hash of the public key of SP.

The associated automated agent(s) may be set up by the SP in accordance with the contract and the procedures detailed in the section above entitled agent establishment. For a while, as Alice is the only owner of the Investment, she (her nominated public key) is the sole recipient of the accrued rental and also the payer of contractual upkeep payments. Transaction SP-S4-T2 shows the first income distribution for this back to Alice which is assumed to be 2,000 Satoshis/share.

Later Alice offers 49 shares using a P2P Exchange service and manages to sell 29 shares to Bob and 20 shares to Eve in a transaction as set out in FIG. 22. As the automated agents are already set up, the change in income/cost payments occurs seamlessly based solely on the transfer of the Investment tokens.

At this point, the issuance UTXO is spent with three outputs: one back to Alice, one to a redeem script with Bob's public key and one to a redeem script with Eve's public key. This is shown in transaction ALICE-S4-T1.

There is also the second investment return transaction shown (SP-S4-T3) which shows the new split of the investment return.

The transaction detailed in FIG. 22 has four outputs. In order for Alice to spend the first output, the system requires a signed hash of the following redeem script:
OP_2 House1MetadataA House1MetadataB InvestMetadata1 InvestMetadata2 PubK-Alice PubK-SP OP_6 OP_CHECKMULTISIG In order for Bob to spend the second output, the system requires a signed hash of the following redeem script:
OP_2 House1MetadataA House1MetadataB InvestMetadata1 InvestMetadata2 PubK-Bob PubK-SP OP_6 OP_CHECKMULTISIG In order for Eve to spend the third output, the system requires a signed hash of the following redeem script:
OP_2 House1MetadataA House1MetadataB InvestMetadata1 InvestMetadata2 PubK-Eve PubK-SP OP_6 OP_CHECKMULTISIG The fourth output spends the change from the transaction back to Alice.

The system is operative to generate a transaction enabling a return to be paid by SP to Alice, Bob and Eve. Such a transaction is illustrated in FIG. 23.

In summary, the system enables the Asset and the Investment to remain separate both in terms of documentation and processing which means there are separate tokens representing the asset itself (house) and the investment product. There are also separate DHTs that are separately managed: the registry DHT is managed by BLAR while the Investment DHT (and its attendant Automated agents) are managed by Alice's SP.

The system may be configured to enable a contract to be referenced using metadata in a blockchain transaction, using a codification scheme which enables the contract to be formatted a in a variety of ways. Such a suitable codification scheme is now described.

Codification Scheme

The metadata which is used to reference the contract can be formatted in a variety of ways. However, a suitable codification scheme is described here.

A contract is transferable if the rights it defines are conferred upon the holder or owner of the contract. An example of a non-transferable contract is one in which the participants are named—that is, where the rights are conferred upon a specific named entity rather than the holder of the contract. Only transferable contracts are discussed in this codification scheme.

A token represents a specific contract that details or defines rights conferred by a contract. In accordance with the present invention, the token is a representation of the contract in the form of a bitcoin transaction.

This codification method uses metadata comprising three parameters or data items. This data may be indicative of:
i) an amount of shares available under the contract (this may be referred to herein as 'NumShares');
ii) a quantity of transfer units to be transferred from a sender to at least one recipient (this may be referred to herein as 'ShareVal'); and
iii) a factor for calculating a value for the quantity of transfer units (this may be referred to herein as a 'pegging rate').

An advantage of this codification scheme is that it can be used to encapsulate or represent contracts as tokens on a blockchain using only the three parameters described above. In effect, the contract can be specified using a minimum of these three data items. As this codification scheme can be used for any type of transferable contract, common algorithms can be devised and applied. Further detail of these metadata items is provided as follows.

Generating a Public Key for an Asset

The system may generate a public key for an asset using a method of sub-key generation as now described.

Figure 2B:
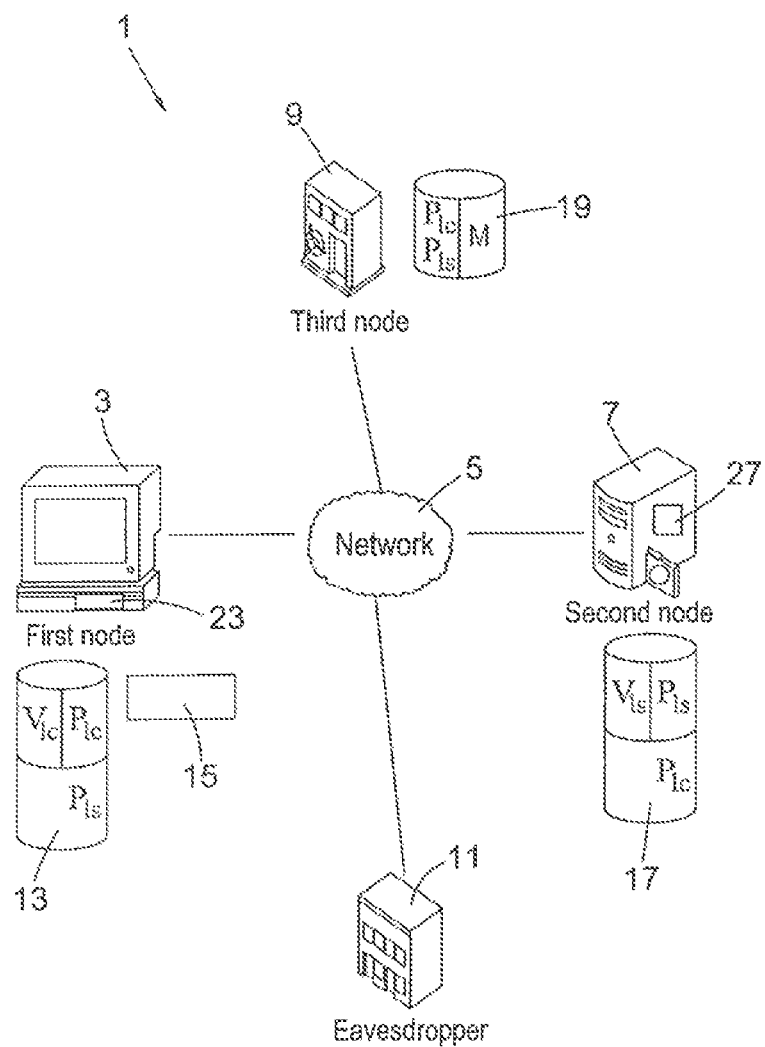
Figure 2C:
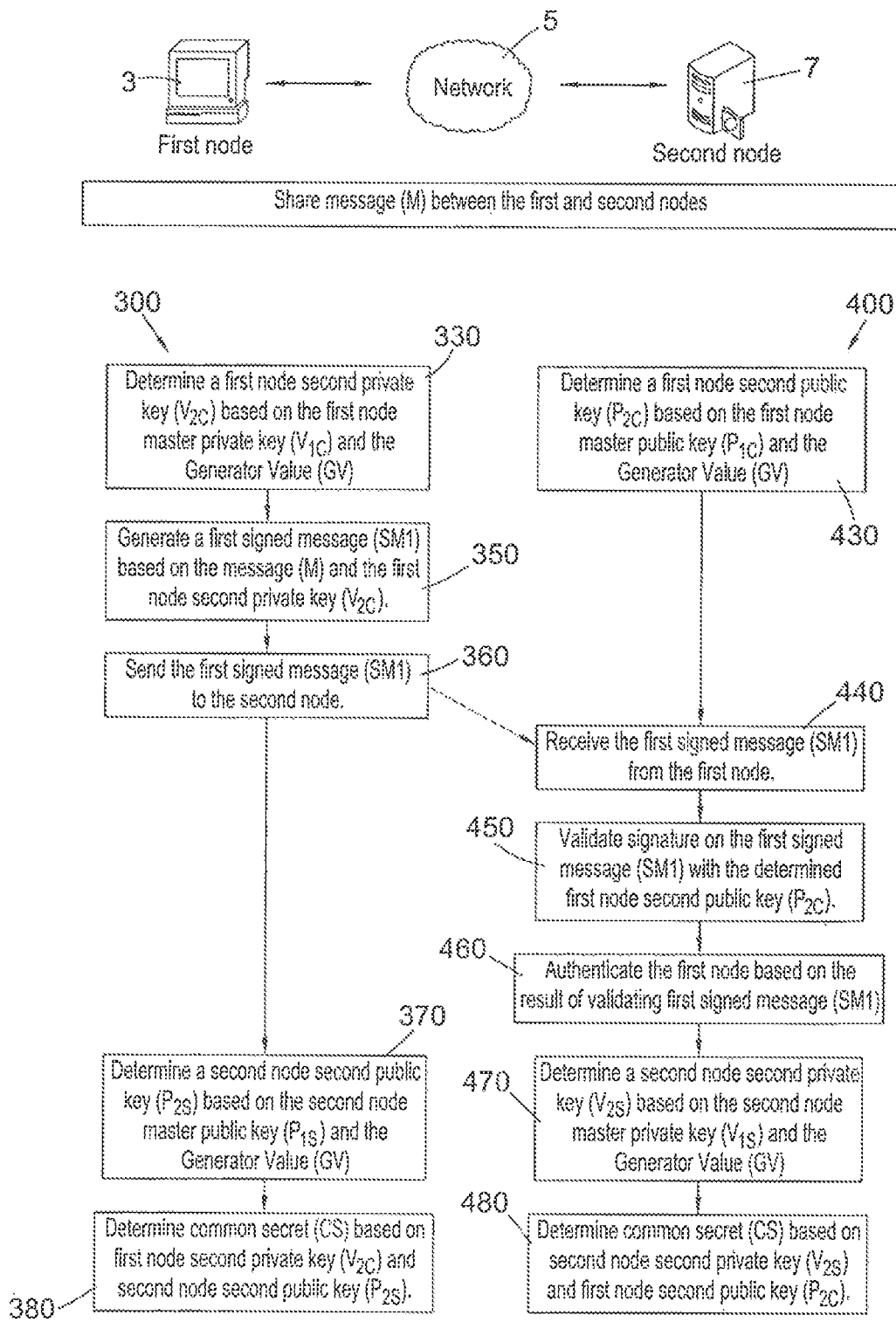

FIG. 2b illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key (V is) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

The methods 300, 400 may include additional steps. See FIG. 2f. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 will be described with reference to FIG. 2d, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C}=V_{1C} \times G \qquad \text{(Equation 1)}$$

Thus the first asymmetric cryptography pair includes:

$V_{1C}$: The first node master private key that is kept secret by the first node.

$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 2D:
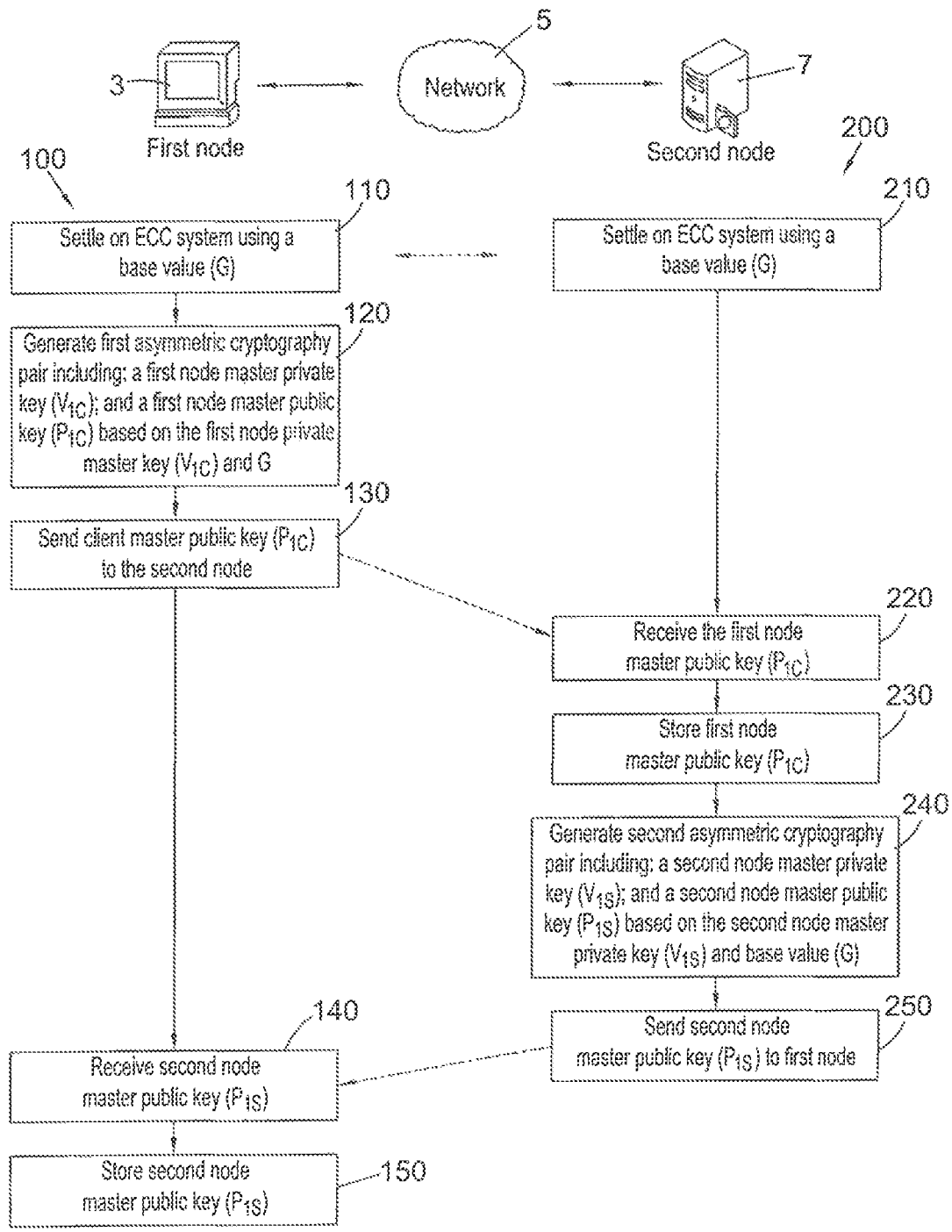

The method 100 further includes sending 130 the first node master public key ($P_{1C}$), over the communications network 5, to the second node 7, as shown in FIG. 2d. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key (V is) and the second node master public key ($P_{1S}$). The second node master private key (V is) is also a random integer within the allowable range. In turn, the second node master public key ($P_{1S}$) is determined by the following formula:

$$P_{1S} = V_{1S} \times G \quad \text{(Equation 2)}$$

Thus the second asymmetric cryptography pair includes:

$V_{1S}$: The second node master private key that is kept secret by the second node.

$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

Figure 2E:
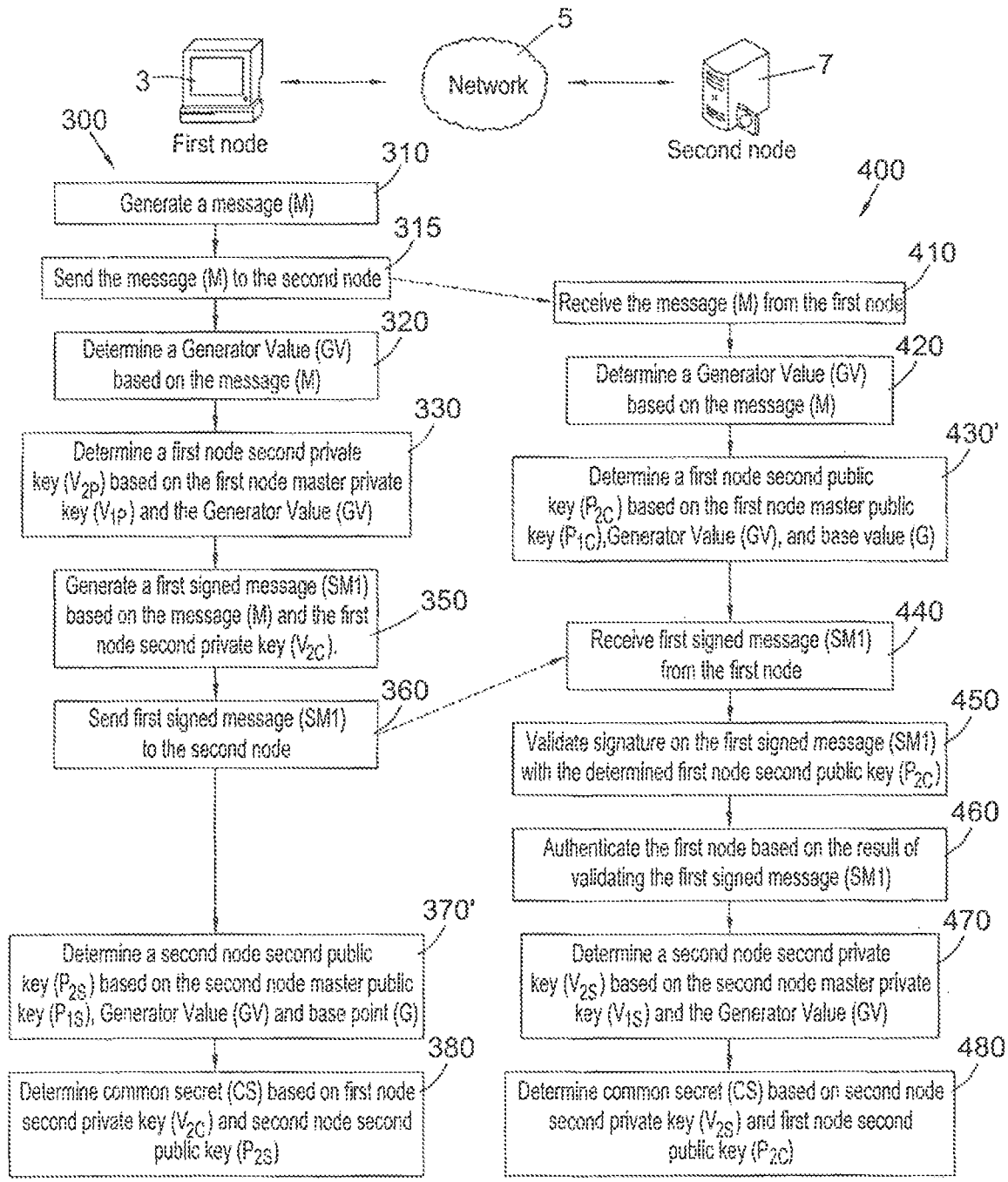
Figure 2F:
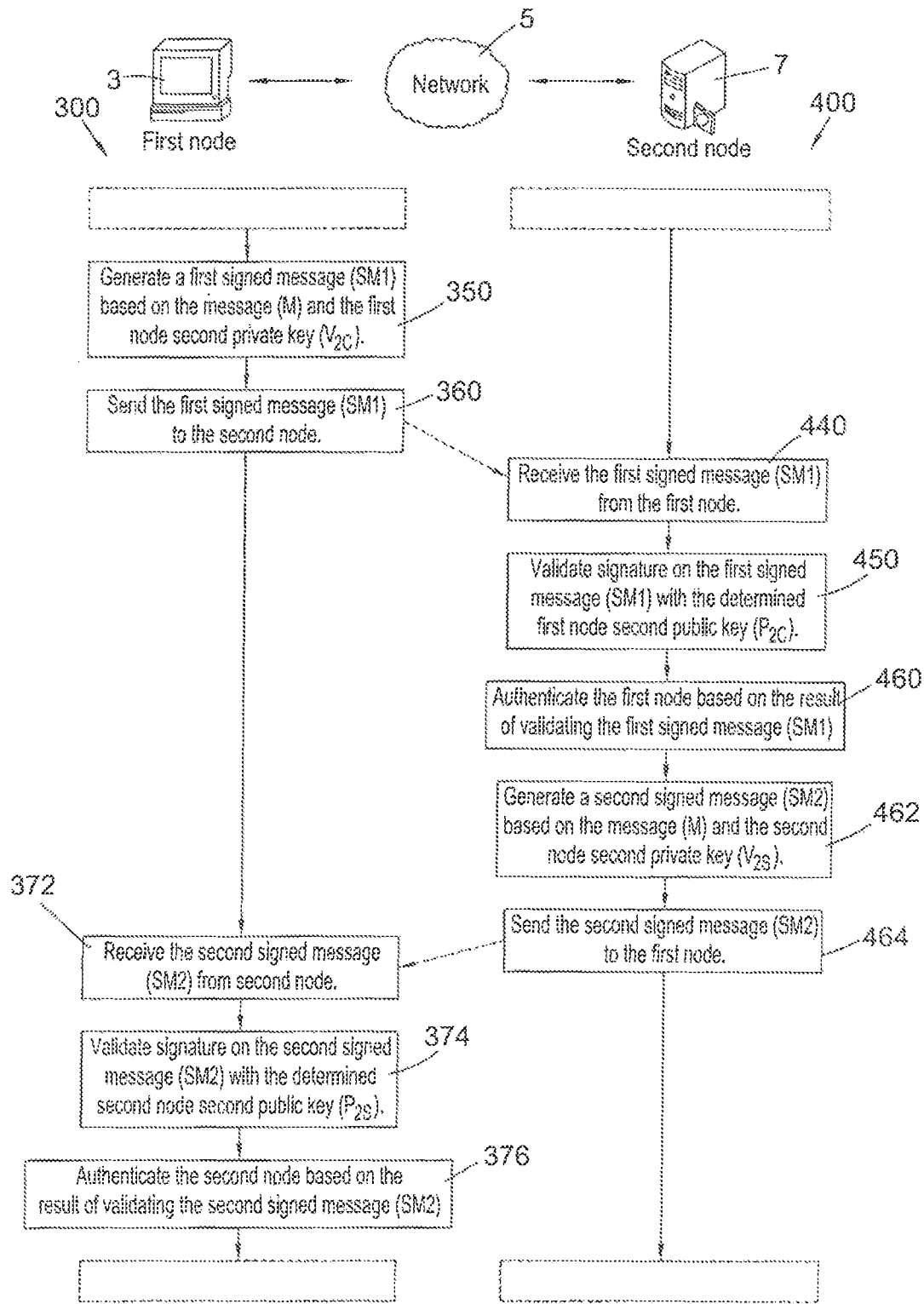

An example of determining a common secret (CS) will now be described with reference to FIG. 2e. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message } (M) = \text{UnixTime} + \text{nonce} \quad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV = \text{SHA-256}(M) \quad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C} = V_{1C} + GV \quad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \quad \text{(Equation 6)}$$

Substitution of $V_{2C}$ from Equation 5 into Equation 6 provides:

$$P_{2C} = (V_{1C} + GV) \times G \quad \text{(Equation 7)}$$

where the '+' operator refers to elliptic curve point addition. Noting that elliptic curve cryptography algebra is distributive, Equation 7 may be expressed as:

$$P_{2C} = V_{1C} \times G + GV \times G \quad \text{(Equation 8)}$$

Finally, Equation 1 may be substituted into Equation 7 to provide:

$$P_{2C} = P_{1C} + GV \times G \quad \text{(Equation 9.1)}$$

$$P_{2C} = P_{1C} + \text{SHA-256}(M) \times G \quad \text{(Equation 9.2)}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S}=V_{2S} \times G \quad \text{(Equation 10.1)}$$

$$P_{2S}=P_{1S}+GV \times G \quad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S=V_{2C} \times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C}=V_{2C} \times G \quad \text{(Equation 12.1)}$$

$$P_{2C}=P_{1C}+GV \times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The Second Node 7 Determining the Common Secret

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S}=V_{1S}+GV \quad \text{(Equation 13.1)}$$

$$V_{2S}=V_{1S}+\text{SHA-256}(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S=V_{2S} \times P_{2C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \quad \text{(Equation 11)}$$

$$S = V_{2C} \times (V_{2S} \times G)$$

$$S = (V_{2C} \times V_{2S}) \times G \quad \text{(Equation 15)}$$

Turning to the common secret (CS) determined by the second node 7, Equation 12.1 can be substituted into Equation 14 as follows:

$$S = V_{2S} \times P_{2C} \quad \text{(Equation 14)}$$

$$S = V_{2S} \times (V_{2C} \times G)$$

$$S = (V_{2S} \times V_{2C}) \times G \quad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point (xs, ys). This may be converted into a standard key format using standard publicly known operations agreed by the nodes 3, 7. For example, the xs value may be a 256-bit integer that could be used as a key for $AES_{256}$ encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

Hierarchy of Generator Values (keys)

For example, a series of successive Generator Values (GVs) may be determined, where each successive GV may be determined based on the preceding Generator Value (GV). For example, instead of repeating steps 310 to 370 and 410 to 470 to generate successive single-purpose keys, by prior agreement between the nodes, the previously used Generator Value (GV) can be rehashed repeatedly by both parties to establish a hierarchy of Generator Values. In effect, the Generator Value, based on the hash of a message (M), can be a next generation message (M') for the next generation of Generator Value (GV'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the Generator Value (GV'). This is similar to steps 320 and 420 but adapted with the following formulas:

$$M' = SHA\text{-}256(M) \quad \text{(Equation 18)}$$

$$GV' = SHA\text{-}256(M') \quad \text{(Equation 19.1)}$$

$$GV' = SHA\text{-}256(SHA\text{-}256(M)) \quad \text{(Equation 19.2)}$$

The first node 3 may then determine the next generation of the second node second public key ($P_{2S}'$) and the first node second private key ($V_{2C}'$) similar to steps 370 and 330 described above, but adapted with the following formulas:

$$P_{2S}' = P_{1S} + GV' \times G \quad \text{(Equation 20.1)}$$

$$V_{2C}' = V_{1C} + GV' \quad \text{(Equation 20.2)}$$

The second node 7 may then determine the next generation of the first node second public key ($P_{2C}'$) and the second node second private key ($V_{2S}'$) similar to steps 430 and 470 described above, but adapted with the following formulas:

$$P_{2C}' = P_{1C} + GV' \times G \quad \text{(Equation 21.1)}$$

$$V_{2S}' = V_{1S} + GV' \quad \text{(Equation 21.2)}$$

The first node 3 and the second node 7 may then each determine the next generation common secret (CS'). In particular, the first node 3 determines the next generation common secret (CS') with the formula:

$$CS' = V_{2C}' \times P_{2S}' \quad \text{(Equation 22)}$$

The second node 7 determines the next generation common secret (CS') with the formula:

$$CS' = V_{2S}' \times P_{2C}' \quad \text{(Equation 23)}$$

Further generations (CS", CS''', etc.) can be calculated in the same way to create a chain hierarchy. This technique requires that both the first node 3 and the second node 7 keep track of the original Message (M) or the originally calculated Generator Value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1C}$, $V_{1S}$ remain secure.

Tree Structure of Keys

As well as a chain (linear) hierarchy as described above, a hierarchy in the form of a tree structure can be created. With a tree structure, a variety of keys for different purposes such as authentication keys, encryption keys, signing keys, payment keys, etc. may be determined whereby these keys are all linked to a single securely maintained master key. This is best illustrated in FIG. 12 that shows a tree structure 901 with a variety of different keys. Each of these can be used to create a shared secret with another party. Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C} = V_{1C} + \text{SHA-256}(M) \quad \text{(Equation 24)}$$

$$V_{2C}' = V_{1C} \text{SHA-256}(\text{SHA-256}(M)) \quad \text{(Equation 25)}$$

$$V_{2C}'' = V_{1C} \text{SHA-256}(\text{SHA-256}(\text{SHA-256}(M))) \quad \text{(Equation 26)}$$

. . . and so on.

To create a branch, any key can be used as a sub-master key. For example $V_{2C}'$ can be used as a sub-master key ($V_{3C}$) by adding the hash to it as is done for the regular master key:

$$V_{3C} = V_{2C}' + \text{SHA-256}(M) \quad \text{(Equation 27)}$$

The sub-master key ($V_{3C}$) may itself have a next generation key ($V_{3C}'$), for example:

$$V_{3C}' = V_{2C}' + \text{SHA-256}(\text{SHA-256}(M)) \quad \text{(Equation 28)}$$

This provides a tree structure 903 using the master key spawning method as shown in FIG. 13.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Example of an Implementation of an Agent

The present invention can utilise a computing resource or agent (which may sometimes be referred to as an 'oracle') to perform automated aspects of the contract process. An example of a suitable agent is provided below, although other implementations may be used.

The agent may operate in conjunction with the blockchain, using it as the non-erasable tape in the implementation of a Turing machine. This agent runs in parallel with the blockchain network, overseeing and handling the execution of a (looping) process. The looping process is designed to perform a given task such as, for example, the automation of a process or control of a device or system. This parallel resource monitors the state of the blockchain and can cause transactions to be written to the blockchain. In one sense, it utilises the Blockchain as a non-erasable tape of the Turing Machine, with the following definitions and features:

1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the agent is to act as an automated entity that monitors the current state of the Blockchain. It can also receive a signal or input from any off-block source. Depending on the Blockchain state and/or a received input, the agent may perform certain actions. The agent decides which action(s) are to be performed. These may or may not involve actions in the 'real world' (i.e. off block) and/or actions on the Blockchain (such as creating and broadcasting new transactions). The action that the agent takes may be triggered by the Blockchain state. The agent may also decide on the next set of transactions to be broadcast to the Bitcoin network, and subsequently written to the Blockchain.

The agent's action(s) run in parallel and simultaneously to the Blockchain (eg Bitcoin) network. In a sense, this extends the function of blockchain (eg Bitcoin) script. This continuous monitoring implements the 'loop' control-flow constructs making the combined agent and Blockchain system Turing Complete.

The Turing Machine includes two stacks:
  Data stack: This is represented by the Blockchain as described above.
  Control stack: This is represented by the agent function. This stores information relating to the repeat control-flow function.

The separation of the control stack from the data stack provides the advantage of preventing infinite loops from occurring within the Bitcoin core, mitigating denial-of-service attacks.

The agent manages and runs subroutines that are able to loop via any type of loop construct (e.g. FOR-NEXT; REPEAT UNTIL; etc). An illustrative embodiment described herein includes a process using one example of the 'repeat' construct. The user may specify the index (i) and the limit (J). These represent the current iteration number (typically counted starting from 0) and the total number of iterations of the repeat loop respectively.

For each iteration:
1. The Index increments by 1. For the exit condition, the iterations will stop when the index reaches the limit;
2. A code block containing an "if condition then action" (ICTA) statement is executed; the action may be any action on or off the blockchain; and
3. A cryptographic hash of this subroutine is computed. This can be stored in the Blockchain as part of a transaction. Since the hash is unique to each code, it will enable verification of which code has been used.

The body of the loop includes a code block. Each code block contains a "If condition then action" (ICTA) statement. This monitors the current state of the Blockchain for transactions matching the:
  Start or triggering condition (e.g when a particular date is reached).

Repeat condition (i.e. a metadata or hash associated with the previous iteration).

Stop condition (i.e. last iteration of the loop).

The ICTA statement enables the agent to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash AnyoneCanPay' in one of the transaction inputs. This permits anyone to contribute to the inputs of the transaction. This parameter enables the agent's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g. C, C++, Java) and not limited to information stored on the Blockchain. For example, it could monitor the date and time (i.e. when a certain date and time are reached) or monitor the weather (i.e. when the temperature is below 10° C. and it is raining), monitor the conditions of a contract or a trust (i.e. when company A buys company B).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form. However, in one embodiment, the metadata may store a hyperlink to a file containing more data or instructions relating to the action. The metadata may store both a hyperlink to a hash table containing more data or instructions relating to the action along with a hash of the action that acts as the loop-up key for the hash table.

The agent's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'alt stack'.

The op codes are:

OP_TOALTSTACK—which moves data from the top of the main stack onto the top of the alt stack.

OP_FROMALTSTACK—which moves data from the top of the alt stack to the top of the main stack.

This enables data from intermediate steps of calculations to be stored in the alt stack, similar to the 'memory' function which allows data to be stored on the calculator. In one embodiment, the alt stack is used for configuring bitcoin scripts to solve small computation tasks and returning the results in the computation.

Using a Code Register to Manage the Agent

The agent also manages a registry of all the codes that it owns and runs. This registry is structured like a lookup table or dictionary that maps a specific key to a specific value. The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly. The implementation of the code registry can vary.

Transaction Metadata of the Agent's Code, and Re-Spawning of the Loop

Information required to respawn the agent's loop at a particular iteration is stored as metadata in the transaction recorded on the Blockchain.

In this way, a transaction on the blockchain stores or provides access to information about a given iteration of the loop which is being executed on the agent. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. The metadata recorded with the transaction also gives the ability to record an audit trail of how the code has been executed in the past.

There are several ways in which the agent could respawn the repeat loop code block at each iteration. The code block might be hard-coded into the agent itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g. bitcoin transaction) or from an external source such as an internal database or a private/public file or hash table or any combination of the above. Pointers to the external source of parameter values might be stored in metadata in a transaction.

The following steps provide one example of how the agent can respawn a repeat loop code block at the ith iteration. In this example, the code registry is a hash table whereby the hash values act as look-up keys for the table and are stored in metadata on transactions.

1. The agent monitors the Blockchain for transactions that contain hashes of the code block that matches entries in the code registry.
2. The agent finds a transaction that contains the corresponding hash ($H_1$).
3. The agent reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The agent reads the 'Metadata-CodeHash' which stores the index I, and respawns the code at the $i^{th}$ iteration. In other words, the loop is 'reloaded' at the appropriate iteration.
5. The signature of the User is included in the P2SH command to verify the origin of the metadata.
6. The agent reads the 'Metadata-OutputHash' and 'Metadata-OutputPointer' to retrieve the output of the previous steps, if these data are required for this iteration of the loop.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A blockchain-implemented control method, the method comprising:
deriving a public-key-private key cryptographic pair for a portion of data related to a smart contract associated with an asset, wherein the smart contract is stored in a computer-based resource that is separate to the blockchain;
deriving a signature for the portion of data using the public key-private key cryptographic pair; and
codifying the portion of data to generate codified metadata for the data, wherein the codified metadata is arranged to reference or provide access to the smart contract;
transmitting the codified metadata to the blockchain; and
receiving a signature and a script from at least one user to enable access to embedded data, wherein the script comprises a public key of a signatory.

2. A method according to claim 1 and comprising the step of deriving one or both of the keys in the cryptographic key from an existing cryptographic key pair, by:
determining a first entity second private key based at least on a first entity master private key and a generator value;
determining a second entity second private key based at least on a second entity master private key and the generator value; and
determining a common secret (CS) at the first entity based at least on the first entity second private key and a second entity second public key, and determining the common secret (CS) at the second entity based on the second entity second private key and first entity second public key, wherein
the first entity second public key is based on at least the generator value and the first entity master key; and
the second entity second public key is based on at least the generator value and the second entity master key.

3. A method according to claim 1, wherein the metadata comprises a hash of the data.

4. A method according to claim 1, wherein the metadata comprises a pointer to the data.

5. A method according to claim 1, wherein the hash is used as a primary key in a lookup table where the data is stored.

6. A method according to claim 1, and further comprising: generating or deriving one or both keys in a cryptographic key pair by:
determining, at a first node (C), a common secret (CS) that is common with the first node (C) and a second node (S),
wherein the first node (C) is associated with a first asymmetric cryptography pair having a first node master private key (Vic) and a first node master public key (Pic), and the second node (S) is associated with a second asymmetric cryptography pair having a second node master private key (Vis) and a second node master public key (Pis);
determining a first node second private key (V2c) based on at least the first node master private key (Vic) and a deterministic key (DK);
determining a second node second public key (P2s) based on at least the second node master public key (Pis) and the deterministic key (DK); and
determining the common secret (CS) based on the first node second private key (V2c) and the second node second public key (P2s),
wherein the second node (S) has the same common secret (S) based on a first node second public key (P2c) and a second node second private key (V2s), wherein:
the first node second public key (P2c) is based on at least the first node master public key (Pic) and the deterministic key (DK); and
the second node second private key (Vis) is based on at least the second node master private key (Vis) and the deterministic key (DK).

7. A method according to claim 6, wherein the deterministic key (DK) is based on a message (M).

8. A blockchain-implemented control system operative to:
derive a public-key-private-key cryptographic key pair for a portion of data, wherein the portion of data related to a smart contract associated with an asset, wherein the smart contract is stored in a computer-based resource that is separate to the blockchain;
derive a signature for the portion of data using the public key-private key cryptographic pair;

codify the data to generate codified metadata for the portion of data, wherein the codified metadata is arranged to reference or provide access to the smart contract;

transmit the codified metadata to the blockchain; and receive a signature and a script from at least one user to enable access to embedded data, wherein the script comprises a public key of a signatory.

9. A system according to claim 8, the system further operative to: transmit the codified metadata to the blockchain.

10. A system according to claim 8, the system further operative to:

receive a signature and a script from at least one user to enable access to embedded metadata.

11. A system according to claim 10, wherein the script comprises a public key of a signatory.

12. A system according to claim 8, the system further operative to generate a hash of the data and to store that hash as part of the metadata.

13. A system according to claim 8, the system further operative to generate a pointer to the data.

14. A system according to claim 12, wherein the system is further operative to store the hash as a primary key in a lookup table where the data is stored.

15. A system according to claim 8, the system arranged to determine, at a first node (C), a common secret (CS) that is common with the first node (C) and a second node (S), wherein the first node (C) is associated with a first asymmetric cryptography pair having a first node master private key (Vic) and a first node master public key (Pic), and the second node (S) is associated with a second asymmetric cryptography pair having a second node master private key (Vis) and a second node master public key (Pis), by:

determining a first node second private key (V2c) based on at least the first node master private key (Vic) and a deterministic key (DK);

determining a second node second public key (P2s) based on at least the second node master public key (Pis) and the deterministic key (DK); and determining the common secret (CS) based on the first node second private key (V2c) and the second node second public key (P2s), wherein the second node (S) has the same common secret (S) based on a first node second public key (P2c) and a second node second private key (V2s), wherein:

the first node second public key (P2c) is based on at least the first node master public key (Pic) and the deterministic key (DK); and the second node second private key (V2s) is based on at least the second node master private key (Vis) and the deterministic key (DK).

16. A system according to claim 15, wherein the deterministic key (DK) is based on a message (M).

17. A system according to claim 8, wherein the system is arranged to derive one or both of the keys in the cryptographic key pair from an existing cryptographic key pair, by:

determining a first entity second private key based on at least a first entity master private key and a generator value;

determining a second entity second private key based on at least a second entity master private key and the generator value;

determining a common secret (CS) at the first entity based on the first entity second private key and a second entity second public key, and determining the common secret (CS) at the second entity based on the second entity second private key and first entity second public key, wherein the first entity second public key is based on at least the generator value and the first entity master key; and the second entity second public key is based on at least the generator value and the second entity master key.

\* \* \* \* \*